United States Patent
Bradfield

(10) Patent No.: US 11,726,803 B2
(45) Date of Patent: Aug. 15, 2023

(54) ARTIFICIAL INTELLIGENCE BASED SYSTEMS AND METHODS FOR AUTONOMOUSLY GENERATING CUSTOMER SERVICE HELP GUIDES WITH INTEGRATED GRAPHICAL COMPONENTS AND FOR AUTONOMOUSLY ERROR-CHECKING KNOWLEDGE BASE SUPPORT RESOURCES

(71) Applicant: ORANGE MANAGEMENT INC., Brooklyn, NY (US)

(72) Inventor: Andrew Michael Bradfield, Brooklyn, NY (US)

(73) Assignee: ORANGE MANAGEMENT INC., Brooklyn, NY (US)

( * ) Notice: Subject to any disclaimer, the term of this patent is extended or adjusted under 35 U.S.C. 154(b) by 0 days.

(21) Appl. No.: 17/684,082

(22) Filed: Mar. 1, 2022

(65) Prior Publication Data
US 2022/0276882 A1    Sep. 1, 2022

Related U.S. Application Data

(60) Provisional application No. 63/155,044, filed on Mar. 1, 2021.

(51) Int. Cl.
*G06F 3/048* (2013.01)
*G06F 9/451* (2018.01)
(Continued)

(52) U.S. Cl.
CPC .......... *G06F 9/453* (2018.02); *G06F 9/45512* (2013.01); *G06F 16/951* (2019.01)

(58) Field of Classification Search
CPC ..... G06F 9/453; G06F 9/45512; G06F 16/951
See application file for complete search history.

(56) References Cited

U.S. PATENT DOCUMENTS

| 7,506,257 B1 * | 3/2009 | Chavez | G06F 11/1451 715/714 |
| 2014/0123295 A1 * | 5/2014 | Kuykendall | G06F 21/577 726/25 |

(Continued)

FOREIGN PATENT DOCUMENTS

| CN | 113094568 A * | 7/2021 | |
| WO | WO-0055761 A2 * | 9/2000 | G06F 17/24 |
| WO | WO-2021074459 A1 * | 4/2021 | G06F 40/35 |

*Primary Examiner* — Rashawn N Tillery
(74) *Attorney, Agent, or Firm* — Marshall, Gerstein & Borun LLP

(57) ABSTRACT

Artificial intelligence (AI) based computer systems and methods are disclosed for autonomously creating customer service help guides via a graphic user interface (GUI). Computing instructions operating on processor(s) are configured to automatically crawl digital product categorie(s) and create action script(s) derived therefrom. The action script(s) comprise user directive(s) for completing user task(s) on a computing device and software application configured to render a GUI. A natural language understanding (NLU) model associates the action script(s) with text of the user task(s). The action script(s) are tested against completion criteria to output success result(s). An AI model is trained on the action script(s), the text of the user tasks, and the completion criteria. A client device of user may request assistance with a given task, and may render, in response, graphic-and-text display(s) associated with a relevant action script (as determined by the AI model) on a GUI of the client device.

19 Claims, 21 Drawing Sheets

(51) Int. Cl.
    *G06F 9/455*     (2018.01)
    *G06F 16/951*     (2019.01)

(56) References Cited

U.S. PATENT DOCUMENTS

| | | | |
|---|---|---|---|
| 2015/0106692 A1* | 4/2015 | Bolchini | G06F 3/0481 |
| | | | 715/234 |
| 2017/0300482 A1* | 10/2017 | Gopalakrishnan | G06F 9/453 |
| 2019/0287197 A1* | 9/2019 | Chang | G09B 5/02 |
| 2020/0073899 A1* | 3/2020 | Weitz | G06F 16/951 |
| 2020/0159552 A1* | 5/2020 | Bodin | G06F 9/454 |
| 2022/0092683 A1* | 3/2022 | Kochura | G06F 40/295 |

* cited by examiner

FIGURE 2M

2120 helpgenius.com

HelpGenius

Account ∨

Account
Billing Info
  View Latest Invoice
  View All Invoices
  Payment Information
  Update Credit Card
Help
Contact Us First Name Last Name Credit Card Number Expiration Date Security Code Country Zip Code

2130 helpgenius.com

HelpGenius — Account ⌄

Account
Billing Info
  View Latest Invoice
  View All Invoices
  Payment Information
  Update Credit Card
Help
Contact Us First Name [ ]  Last Name [ ]

Credit Card Number [ ]

Expiration Date [ ]  Security Code [ ]

Country [ ]  Zip Code [ ]

Enter New Credit Card Info Here — 2132

FIGURE 2N helpgenius.com

HelpGenius

Account ⌄

Enter New Credit Card Info Here
2142

Account
Billing Info
　View Latest Invoice
　View All Invoices
　Payment Information
　Update Credit Card
Help
Contact Us First Name　　　　　Last Name Credit Card Number Expiration Date　　　Security Code Country　　　　　　Zip Code

FIGURE 2O

[1] After Successful Task Completion, A Redundancy Assessment Tool Is Used To Eliminate Unnecessary Or Redundant Actions Prior To Final Database Entry.

[1] After Successful Task Completion, A Redundancy Assessment Tool Is Used To Eliminate Unnecessary Or Redundant Actions Prior To Final Database Entry.

ARTIFICIAL INTELLIGENCE BASED SYSTEMS AND METHODS FOR AUTONOMOUSLY GENERATING CUSTOMER SERVICE HELP GUIDES WITH INTEGRATED GRAPHICAL COMPONENTS AND FOR AUTONOMOUSLY ERROR-CHECKING KNOWLEDGE BASE SUPPORT RESOURCES

CROSS REFERENCE TO RELATED APPLICATION(S)

This application claims the benefit of U.S. Provisional Application No. 63/155,044 (filed on Mar. 1, 2021). The entirety of the foregoing provisional application is incorporated by reference herein.

FIELD OF THE DISCLOSURE

The present disclosure generally relates to artificial intelligence ("AI") based systems and methods for autonomously analyzing, abstracting, extracting, validating and/or error-checking existing user/customer support help resources and for autonomously generating new user/customer support help guides with integrated graphic components, and, more particularly, to artificial intelligence based systems and methods for autonomously analyzing, abstracting, extracting, validating and error-checking existing user/customer support help resources and for autonomously generating new user/customer support help guides with integrated graphic components, such one or more graphic user interfaces ("GUI's), based on machine learning or otherwise artificial intelligence models implementing natural language understanding ("NLU") algorithms.

BACKGROUND

Among the customer service support options available to customers and other users of present-day websites, mobile apps, software applications and other digital products, the self-help options—FAQ articles, knowledge bases, how-to guides, interactive guides, tutorials, etc. ("help bases")—are notoriously difficult to use, particularly for less sophisticated users. Among other things, they are: hard to search, inaccurate, badly written, unclear, out of date, ambiguous, wordy, or in conflict with other available help resources/ guidance, and often filled with typos and bad or dead "links", etc. Most notably, help bases often lack visual tools and graphic elements, thereby frustrating their main purpose—to clearly explain the steps required to resolve a customer/user issue, even when the help base material is error-free.

Even if a help base starts out with high quality, accurate content, those directives, data, graphics or information otherwise contained or referenced can quickly become outdated, defective or irrelevant because the underlying product, service, or features, described by such help bases, are themselves changed, updated, or otherwise evolved over time.

It must be noted that automated help solutions, sometimes referred to as chatbots, (whether delivered via chat windows, interactive guides or voice-activated controls) are also negatively impacted by the shortcomings of these help bases, since the chatbots depend largely on the information in help bases or on manual programming from product designers/ programmers when they provide customer support responses.

Accordingly, for the foregoing reasons, there is a strong need for automated, AI-based systems and methods that can process this plentiful universe of semi-structured help base content in order to autonomously and efficiently discover and correct help base errors in real-time on a perpetual basis. Similarly, there is also a strong need for computer models which can autonomously discover, execute and test the best solutions for customer service support tasks, even without the guidance of previously created help base content. Finally, there is also a strong need for automated, AI-based systems and methods that can autonomously and efficiently generate new, superior customer support self-help guides with clarifying graphic components ("help guides")—which are automatically error-checked and updated to conform in real-time to actual world conditions.

BRIEF SUMMARY

While unwieldy and difficult to use, help base data does have certain characteristics which make it conducive to data processing via an AI-based system, for example as described below.

1. Data in help bases is plentiful.
2. The data is accessible and free, often without any account registration or login required.
3. The data is semi-structured—the help directives are often subdivided into steps, using ordinal numbering indicators.
4. The key elements of the data have salient structured elements: e.g. in the directive "click on Settings", there is a common action term, a capitalized term and (often) a hyperlink showing the targeted next step.
5. Some help base articles have customer helpfulness ratings displayed, providing a prima facie indication of the quality and usefulness of such article, thereby allowing a machine learning system to weight its content more favorably.
6. A machine learning system seeking to confirm its interpretations of help base articles benefits from easy-to-detect errors in its output product. Any NLU processing of a help base article that results in an error state in the computing system being used (e.g. "page not found", "404 error", application crash, etc.) can be automatically de-weighted.
7. Similar to #6, once a computer model has been trained to autonomously execute and test customer support tasks, it can easily detect when an execution has gone awry, because of the same easy-to-detect errors (e.g. "page not found", application crash, "error" messages displayed in a GUI, etc.).

Nonetheless, the resources in the wide universe of help bases need to be easier to access, easier to validate and easier to error-correct. Similarly, the content of the help bases, and self-help customer support guidance in general, need to be easier to understand, with more graphical elements and more "showing" instead of just verbal directions, descriptions and explanations. Given the huge abundance of help base material available and the massive and universal need for self-help guidance, the only way to achieve the goals just described is via automated processes. The AI-based systems and methods (e.g., supervised learning systems and methods), as described herein, provide these automated processes.

In order to achieve these solutions, the AI-based systems described herein incorporate tools which convert text-based help base article directives into recordable and re-playable action scripts, which are maintained in a master database.

These scripts are then tested, validated and corrected using the actual websites, software applications, mobile apps, etc. they are intended for—to ensure that the scripts are always working and valid. The system can provide automated reports regarding errors and autonomously correct and rewrite the master database entries to take account of the required corrections.

These AI-based systems are also tuned, calibrated and trained to allow them to autonomously work de novo on websites, software applications, mobile apps, etc.—i.e. to work on digital products for which there is no prior help base guidance/input. That is, the AI-systems described herein use their previously recorded scripts as guides for deep learning, to be able decipher the steps required to complete user/customer support tasks without the need for referencing any dedicated help base articles or tutorials that are specific to the digital product in question. These newly deciphered scripts can in turn also be converted into help guides.

In view of the above, an artificial intelligence (AI) based computer system configured to autonomously create customer service help guides delivered via a graphic user interface (GUI) with graphical and textual elements is disclosed herein. The AI based computer system may comprise one or more processors and one or more memories. The AI based computer system may further comprise computing instructions stored in the one or more memories that when executed by the one or more processors, cause the one or more processors to automatically crawl one or more digital product categories and create one or more action scripts derived from crawling the one or more digital product categories. The computing instructions, when executed, may further cause the one or more processors to store the one or more action scripts in the one or more memories, wherein each action script is comprised of one or more user directives for completing one or more user tasks on a computing device and by a software application (app) configured to render a GUI on a display screen of the computing device, and wherein each action script corresponds to at least one user task of the one or more user tasks and is adapted to operate on the computing device, the software app, and the GUI. The computing instructions, when executed, may further cause the one or more processors to implement a natural language understanding (NLU) model to associate the one or more action scripts with text of the one or more user tasks stored in the one or more memories. The computing instructions, when executed, may further cause the one or more processors to test the one or more action scripts against completion criteria for each of the one or more user directives to output one or more success results indicating that a least a subset of the one or more actions scripts achieves the competition criteria. The computing instructions, when executed, may further cause the one or more processors to train an AI model based on the one or more actions scripts, the text of the one or more user tasks, and the completion criteria. The AI model may be configured to output an identified action script based on text corresponding to the one or more user tasks as used to train the AI model. The computing instructions, when executed, may further cause the one or more processors to autonomously convert each action script into one or more graphic-and-text displays which can be overlaid onto the GUI of the computing device. The computing instructions, when executed, may further cause the one or more processors to receive a request from a client device of a user for assistance with a given user task, wherein the client device is a device corresponding to the computing device. The computing instructions, when executed, may further cause the one or more processors to render, in response to the request, the one or more graphic-and-text displays associated with a relevant action script on a GUI of the client device of the user to display one or more user directives to visually indicate how to complete the given user task. The relevant action script may be determined by the AI model.

The computing instructions of the AI base computer system, when executed by the one or more processors, may further cause the one or more processors to determine an action locus defining a position on, area of, or location within the GUI for which to implement or render the one or more graphic-and-text displays associated with the relevant action script. The position, area, or location is recorded with the relevant action script so that the graphic-and-text displays associated with each of the one or more user directives can be rendered on the GUI of the client device when the user requests assistance with the given user task.

The computing instructions of the AI base computer system, when executed by the one or more processors, may further cause the one or more processors to determine that validation of a failed action script of the one or more actions scripts has failed; retrain the AI model (i) with action script recordings from a human user performing the same or similar tasks, or (ii) with one or more sets of help base data associated with the task; convert, with the AI model, the action script recordings or sets of help base data into a new action script, the new action script based on an updated version of the failed action script as configured; and validate the new action script prior to storing the new action script in the one or more memories. The validation of the new action script may comprise automatically executing the action script to produce an output result and comparing the output result to one or more completion criteria.

In various aspects at least one of the one or more action scripts may be converted to operate on an intended digital device or with an intended software program that is different from the computing device or software app for which the at least one action script was originally created.

In various aspects associating one or more action scripts with the text comprises adjusting the text or substituting the text based on similar language or graphical syntax.

In various aspects the relevant action script may be executable (or executed) to perform at one of the one or more user directives for the user automatically without additional input from the user.

In various aspects the graphic-and-text displays may be rendered within or part of a separate window video GUI.

In various aspects the graphic-and-text displays may be rendered within or part of the GUI as an overlay on the GUI.

The computing instructions of the AI base computer system, when executed by the one or more processors, may further cause the one or more processors to: receive a novel input comprised of a digital or software product; generate a map of one or more pages or states accessible within the digital or software product out to one or more terminal pages or states, wherein each link or path required to reach the one or more pages or states, including intermediary pages or states, is recorded in the one or more memories; process each of the one or more pages or states using an NLU model to determine which of the one or more task labels from a database of task descriptors are applicable to each of the one or more pages or states; and train the NLU model based on one of the following: (a) the one or more task labels and the one or more pages or states, wherein the NLU model is configured to output a task label based on corresponding one or more pages or states as input; or (b) train the NLU model based on the one or more task labels and the one or more pages or states, wherein the NLU model is configured to output the corresponding one or more pages or states based on a task label as input.

The computing instructions of the AI base computer system, when executed by the one or more processors, may further cause the one or more processors to create and record action scripts by recording the actions of a human operator who has been assigned a specific task to complete on a computing device enabled with a GUI.

In various aspects the computing instructions, when executed by the one or more processors, may further cause the one or more processors to create and record action scripts by (i) autonomously crawling help base resources to identify a set of help base data associated with a task, and (ii) autonomously converting, using the AI model, the help base data into action scripts.

In various aspects the computing instructions, when executed by the one or more processors, further cause the one or more processors to error-check the one or more action scripts on a continuous or periodic basis to confirm that the one or more user directives of the one or more action scripts are without error.

The computing instructions of the AI base computer system, when executed by the one or more processors, may further cause the one or more processors to: update the action scripts so that the one or more user directives of the one or more action scripts comprise one or more of: a direct set of links or paths for completion of the user task, a lack of redundant links or paths, or a reduction of one or more inefficient links or paths.

In various aspects the AI model may be further trained with one or more previously recorded action scripts that have been error-checked or updated.

The computing instructions of the AI base computer system, when executed by the one or more processors, may further cause the one or more processors to assess a progress status of the user as the user progresses through each of the one or more user directives of a given action script, wherein the progress status of the user may be used to confirm that a first one of the one or more user directives has been completed prior to displaying a second one of the one or more user directives associated with a subsequent directive of the given action script.

The computing instructions of the AI base computer system, when executed by the one or more processors, may further cause the one or more processors to display one or more visual messages or play one or more audio messages to alert the user when the user has failed to complete a given user directive of the one or more user directives, and display a user directive to correct an action or complete the given user directive.

In various aspects the autonomous conversion of each action script may further comprise autonomously converting each action script to audio content, wherein the audio content provides one or more user directives audibly indicating how to complete the given user task.

In addition, an artificial intelligence (AI) based computer method is disclosed for autonomously creating customer service help guides delivered via a graphic user interface (GUI) with graphical and textual elements. The AI based computer method may comprise automatically crawling, by one or more processors, one or more digital product categories. The AI based computer method may further comprise creating, by the one or more processors, one or more action scripts derived from crawling the one or more digital product categories. The AI based computer method may further comprise storing, by the one or more processors, the one or more action scripts in one or more memories, wherein each action script is comprised of one or more user directives for completing one or more user tasks on a computing device and by a software application (app) configured to render a GUI on a display screen of the computing device, and wherein each action script corresponds to at least one user task of the one or more user tasks and is adapted to operate on the computing device, the software app, and the GUI. The AI based computer method may further comprise implementing, by the one or more processors, a natural language understanding (NLU) model to associate the one or more action scripts with text of the one or more user tasks stored in the one or more memories. The AI based computer method may further comprise testing, by the one or more processors, the one or more action scripts against completion criteria for each of the one or more user directives to output one or more success results indicating that a least a subset of the one or more actions scripts achieves the competition criteria. The AI based computer method may further comprise training, by the one or more processors, an AI model based on the one or more actions scripts, the text of the one or more user tasks, and the completion criteria. The AI model may be configured to output an identified action script based on text corresponding to the one or more user tasks as used to train the AI model. The AI based computer method may further comprise autonomously converting, by the one or more processors, each action script into one or more graphic-and-text displays which can be overlaid onto the GUI of the computing device. The AI based computer method may further comprise receiving, by the one or more processors, a request from a client device of a user for assistance with a given user task, wherein the client device is a device corresponding to the computing device. The AI based computer method may further comprise rendering, by the one or more processors in response to the request, the one or more graphic-and-text displays associated with a relevant action script on a GUI of the client device of the user to display one or more user directives to visually indicate how to complete the given user task. The relevant action script may be determined by the AI model.

Still further, a tangible, non-transitory computer-readable medium storing instructions for autonomously creating customer service help guides delivered via a graphic user interface (GUI) with graphical and textual elements is disclosed. The computing instructions, when executed by one or more processors, may cause the one or more processors to automatically crawl one or more digital product categories. The computing instructions, when executed by one or more processors, may further cause the one or more processors to create one or more action scripts derived from crawling the one or more digital product categories. The computing instructions, when executed by one or more processors, may further cause the one or more processors to store the one or more action scripts in one or more memories, wherein each action script is comprised of one or more user directives for completing one or more user tasks on a computing device and by a software application (app) configured to render a GUI on a display screen of the computing device, and wherein each action script corresponds to at least one user task of the one or more user tasks and is adapted to operate on the computing device, the software app, and the GUI. The computing instructions, when executed by one or more processors, may further cause the one or more processors to implement a natural language understanding (NLU) model to associate the one or more action scripts with text of the one or more user tasks stored in the one or more memories. The computing instructions, when executed by one or more processors, may further cause the one or more processors to test the one or more action scripts against completion criteria for each of the one or more user directives to output one or more success results indicating that a least a subset of the one or more actions scripts achieves the competition criteria. The computing instructions, when executed by one or more processors, may further cause the one or more processors to train an AI model based on the one or more actions scripts, the text of the one or more user tasks, and the completion criteria. The AI model may be configured to output an identified action script based on text corresponding to the one or more user tasks as used to train the AI model. The computing instructions, when executed by one or more processors, may further cause the one or more processors to autonomously convert each action script into one or more graphic-and-text displays which can be overlaid onto the GUI of the computing device. The computing instructions, when executed by one or more processors, may further cause the one or more processors to receive a request from a client device of a user for assistance with a given user task, wherein the client device is a device corresponding to the computing device. The computing instructions, when executed by one or more processors, may further cause the one or more processors to render, in response to the request, the one or more graphic-and-text displays associated with a relevant action script on a GUI of the client device of the user to display one or more user directives to visually indicate how to complete the given user task. The relevant action script may be determined by the AI model.

In accordance with the above, and with the disclosure herein, the present disclosure includes improvements in computer functionality or in improvements to other technologies at least because the disclosure herein relate to, e.g., AI based computer method for autonomously converting and error-checking existing help base resources, which reduces or coverts existing help base articles and related data into more efficient and/or streamlined help base articles and related data that require less computer memory to store and process. That is, the present disclosure describes improvements in the functioning of the computer system itself or "any other technology or technical field" because the reduced or converted data takes less computer memory to store, is less error prone, and, as a consequence, results in less processing or compute power to execute in generating related GUIs as described herein. This improves over the prior art at least because prior art systems are error prone, tend to become outdated (with respect to help base articles and related data), and require more memory and processing capabilities in order to store non-efficient and error-prone help base data.

In addition, the present disclosure includes effecting a transformation or reduction of a particular article to a different state or thing, e.g., transformation or reduction of prior, and possibly error-prone help base articles, into interactive and/or error-free help base articles.

Still further, the present disclosure includes specific features other than what is well-understood, routine, conventional activity in the field, and/or otherwise adds unconventional steps that confine the disclosure to a particular useful application, e.g., artificial intelligence (AI) based computer systems and methods for autonomously converting and error-checking existing help base resources.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 2M illustrates a further example GUI in accordance with various aspects disclosed herein.

FIG. 2N illustrates a further example GUI in accordance with various aspects disclosed herein.

FIG. 2O illustrates a further example GUI in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION

Various "products" and/or "tools" are described herein. Each of these relate to specific aspects of the invention, and any one of these products and or tools, alone or in combination, constitute an aspect of the disclosure.

Figure 5:
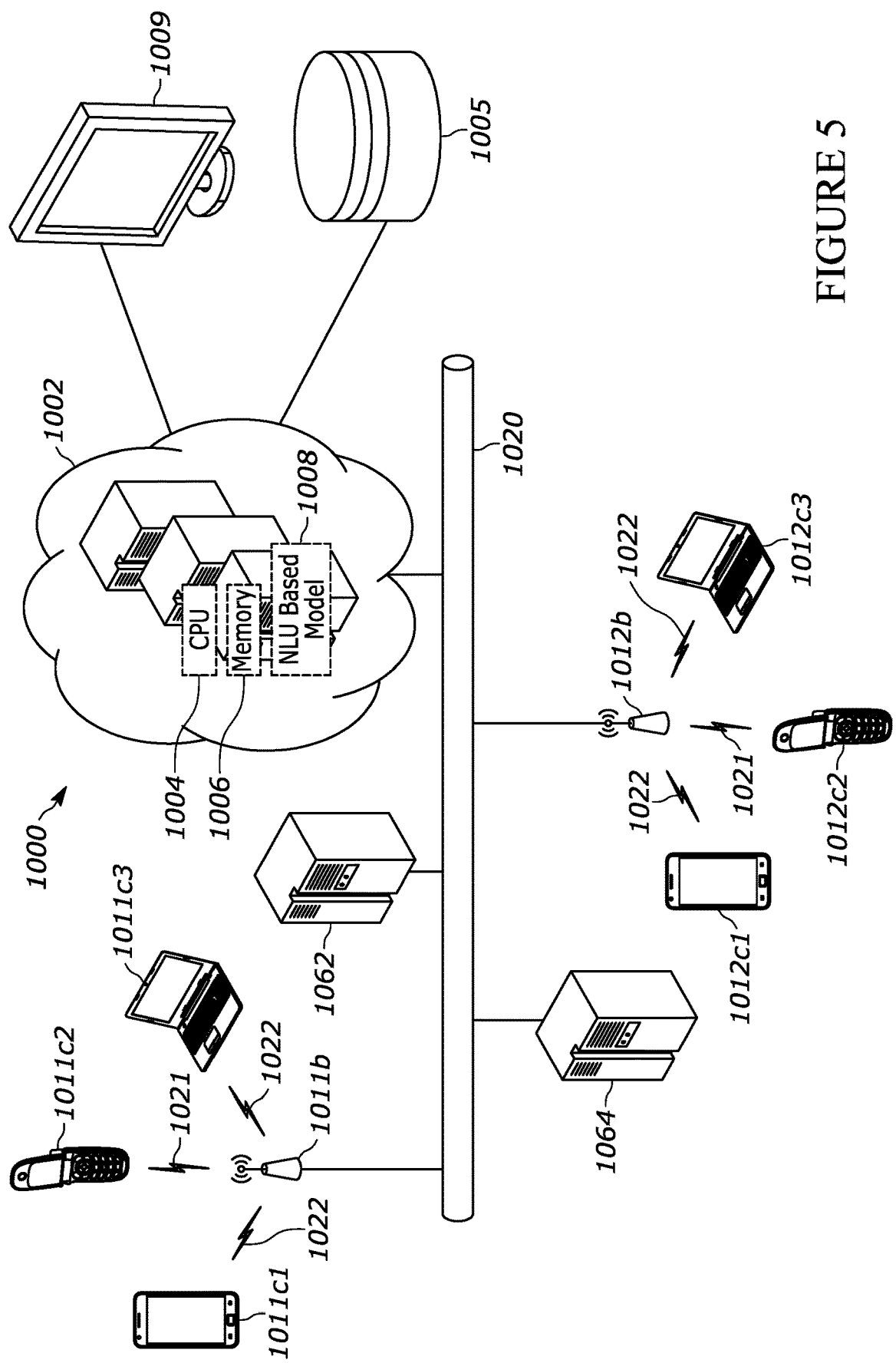
FIG. 5 illustrates an example artificial intelligence (AI) based computer system configured to autonomously convert and error-check existing help base resources, in accordance with various aspects disclosed herein.

As described further herein, each of the various products and/or tools, as described herein, comprise computing code, such as computing instructions, algorithms, applications, or the like, implementable and/or executable by one or more processors (e.g., as described for FIG. 5 or otherwise herein). Such one or more processors may be located, or be installed as part of, various computing devices, which may include, by way of non-limiting example, one or more servers, one or more client devices, or other such computing devices having processor(s) and memorie(s) accessible by such processors (e.g., as described for FIG. 5 or otherwise herein). The memorie(s) may store the computing instructions and related data (e.g., training data or production level data) for training or utilizing AI-based models, such as machine learning models trained with natural language understanding (NLU) algorithms (e.g., as described for FIG. 5 or otherwise herein).

The "products" and/or "tools" involve the autonomous generation and/or creation of customer/user support help resources, or help guides, which include video, graphic, audio, and/or other related digital media assets that may be viewed or otherwise displayed on a computing device, such as a desktop computer, laptop computer, or mobile device, such as an APPLE IPHONE, ANDROID DEVICE, or the like (e.g., as described for FIG. 5 or otherwise herein).

TOOL 1: Tool for Autonomously Interpreting Existing Help Base Content and for Autonomously Troubleshooting, Error-Checking and Performing QA/QC on Existing Help Bases.

Figure 1A:
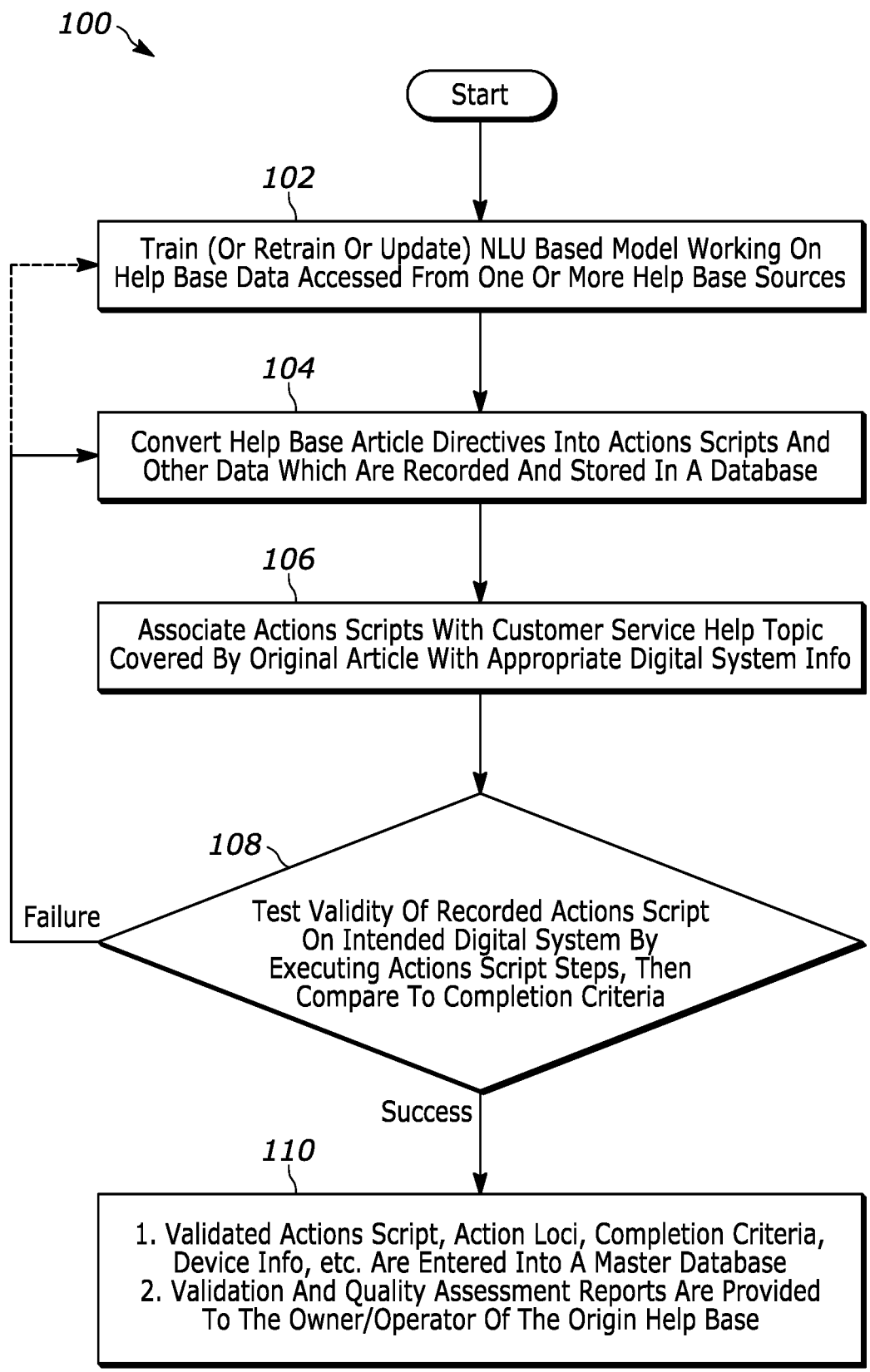
FIG. 1A illustrates a flow diagram of an exemplary artificial intelligence (AI) based computer method for autonomously converting and error-checking existing help base resources, in accordance with various aspects disclosed herein.

TOOL 1 is a tool (e.g., a software or computing instruction-based tool) which performs the processes described below. TOOL 1 is illustrated, by way of non-limiting example, with FIG. 1A. FIG. 1A illustrates an example of AI-based method 100 for autonomously converting and error-checking existing help base resources, in accordance with various aspects herein. In particular, FIG. 1A illustrates a flow diagram of an exemplary artificial intelligence (AI) based computer method 100 for autonomously converting and error-checking existing help base resources, in accordance with various aspects disclosed herein.

Overview.

TOOL 1 can implement Natural Language Understanding ("NLU") algorithms, including customized and/or optimized NLU algorithmic versions adapted from existing NLU algorithm technology. Such NLU algorithms are used to process data infrastructure, content and syntax typically used or found in help bases or other such structured or semi-structured sources of customer/user support help information. Reference is made to FIG. 1A (see, e.g., block 102). Generally speaking, the computing instructions of TOOL 1 implement a machine learning model, trained with a NLU algorithm to analyze help base data and/or information. It is to be understood, however, that TOOL 1 is not necessarily limited to NLU algorithms, and that other AI algorithms (e.g., supervised machine learning) may be used.

TOOL 1 processes the help base data to extract a set of step-by-step directives or suggested actions (an "action script") described by the given help base article, tutorial or guide. For example, the machine learning model may use, or be trained with, a help base input which may comprise or include text or graphical data or other information which may include numbered steps, capitalization of key action terms (e.g. "Settings", "Billing", etc.), hyperlinks, underlined text for key actions, standardized symbols (e.g. the "hamburger" menu icon or the "gear" symbol, etc. It is to be understood that an "action" as described herein may refer to one or more actions.

Training of TOOL 1's NLI Algorithms.

Figure 1B:
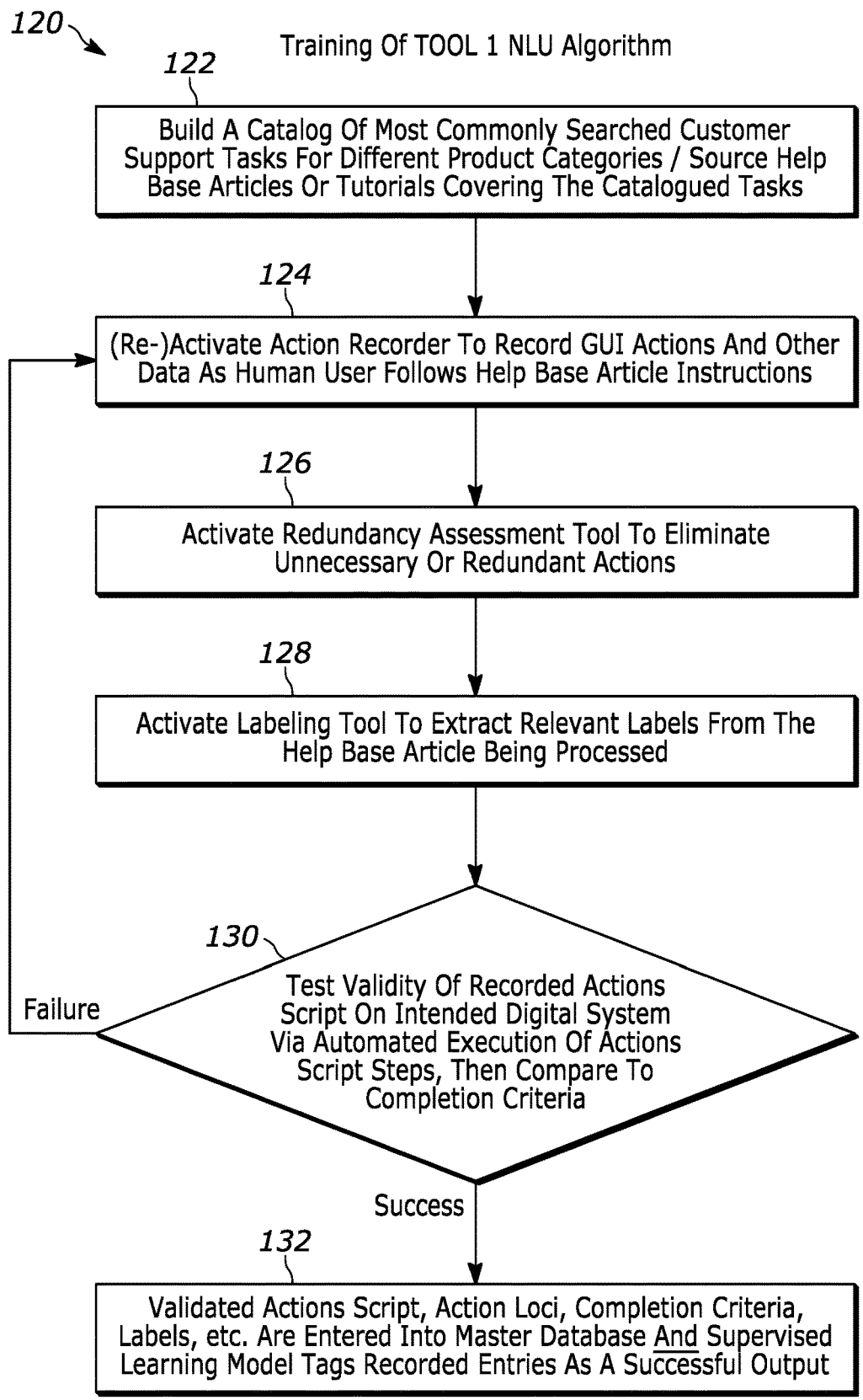
FIG. 1B illustrates a flow diagram of an exemplary method of for training an AI model as used with the AI based computer method of FIG. 1A, and in accordance with various aspects disclosed herein.

TOOL 1 may be initially trained (see, e.g., Method 120 of FIG. 1B) using the most commonly requested customer service/help tasks for different digital product categories. In particular, FIG. 1B illustrates a flow diagram of an exemplary method 120 for training an AI model as used with the AI based computer method of FIG. 1A, and in accordance with various aspects disclosed herein. The training operator of TOOL 1, or an automated set of algorithm instructions, first compiles a list of website(s), software application(s), mobile app(s), and/or other digital product categories and subcategories (each one a "digital product category"). These may include, by way of example only: e-commerce websites, desktop application(s), streaming video apps, news media websites, banking/finance websites, cloud applications (e.g. Dropbox or Airtable), mobile travel booking apps, email clients, social media websites, desktop or laptop photo editing software, and/or the like.

The training operator of TOOL 1, or an automated set of algorithm instructions (see, e.g., block 122) then compiles a list of the most commonly requested help tasks for each digital product category, which are obtained from multiple sources, including publicly and privately accessible data from third-party sources, database APIs, as well as data obtained through the operations of TOOLS 1, 2, 3, 4, 6, 8 and 9 below. These tasks can range from simple tasks, such as tasks relating to "change my credit information" or "download an account statement", to more sophisticated tasks, such as "set up auto-save", "remove red-eye on my photo", etc.

TOOL 1 includes a digital action recorder (the "action recorder"), adapted from previously existing software tools, which records the actions of a user while operating a computer, mobile device or other digital product via GUI.

The TOOL 1 action recorder can record GUI actions, such as: (a) mouse clicking; (b) finger tapping; (c) scrolling; (d) selection of, copying of or deletion of text using a GUI cursor; (e) selection of, copying of or deletion of "pixels" or "area" of GUI space; (f) checking or ticking of boxes or radio buttons; (g) searching for text or numbers on a GUI window; (h) entering of text or numbers on a GUI window (The operator of TOOL 1 can pre-populate the tool with data inputs required to complete standard tasks, e.g. login information, user name, email address, phone number, credit card information, billing address, etc.); (i) the act of "pausing" or waiting until a process has completed, or change of state has occurred; (j) selection or highlighting of text or screen area using a cursor; and/or (k) operation of a peripheral device attached to the computing device, like a printer, camera, microphone, speaker, etc.

The action recorder can also record non-GUI actions, such as verbal commands or physical button-pressing, which cause a change of state in the GUI.

The action recorder can also record error states, such as webpages that show an error message, requested webpages that are unavailable, software application crashes, actions which result in no change to the GUI, etc.

The action recorder can also record an action locus or multiple action loci associated with a given action, if applicable. An action locus is the location, with lesser or greater precision depending on the action, on the GUI where an action has been executed or initiated, e.g. the button to be clicked, the box for entering text, the hyperlink to be selected, etc. The action recorder can record the location of the action locus using various identifying information, including the URL for a webpage, the text of a hyperlink or the shape of a clickable symbol, as well as the approximate quadrant of the GUI.

When activated (see, e.g., block 124), the action recorder automatically records the type of device, version of device, operating system, version of operating system, web browser type, version of web browser, and/or other data about the user's interface and device (each of these is a "device interface" label).

The initial training of TOOL 1 can be achieved using a supervised learning methodology. The end result of the training is an automated tool which does not require human intervention to operate. However, the training of the tool may incorporate input and oversight from human agents to complete the training.

The training operator of TOOL 1 engages one or more (e.g., a team) of typical human agent user(s) (i.e. non-experts) to execute the most common self-help tasks compiled as described above or elsewhere herein. First a human user searches the internet for a help base article covering the self-help task assigned. The user makes a record of the help base article that the user plans to follow, i.e. by recording the uniform resource locator ("URL") of the help base article, or saving the HTML or other content of the article webpage, saving the text content of the article, and/or otherwise recording the content of the article. Then the user executes the steps outlined in the article. While completing these steps required to perform the self-help tasks, the human user activates the digital action recorder to capture the series of actions (along with action loci) undertaken. Prior to performing a given action, the human user selects the text from the step in the help base article it is following. The action recorder records both the action and the help base article text to create a mapping between the two.

The actions performed by the human user(s) (as well as intermediary error states and action loci) are recorded by the action recorder into an action log in a digital format onto a computer or computer server. The recordings are organized in a database where each recording is associated with the relevant digital product categories, the name of the website or digital product, the web browser used (including version), the operating system (including version) used, the type of task being performed, the mappings between help base article text and actions performed, as well as other data. Action logs for tasks which are not successfully completed are deleted (not retained). The successful action logs are called the completed action logs.

Once the completed action logs have been recorded into the database, TOOL 1 automatically runs a verification execution of the logs to make sure that the steps can be played back (i.e., executed or ran) with a successful result. Then TOOL 1 automatically applies a redundancy assessment tool which determines if one or more of the steps undertaken by the user could have been eliminated (see, e.g., block 126). If so, the redundancy assessment tool deletes the redundant steps. This redundancy elimination may also be performed manually by a human operator, if the automated redundancy assessment tool encounters an error. Once a successful verification has been completed post-redundancy assessment, the action log is marked as a validated action log.

TOOL 1's algorithm training is initially based on the inputs and outputs described above, e.g.: labeled input data (each help base article being followed by the human users) and the desired outputs (the relevant validated action log).

TOOL 1 further training is done by processing a wide variety of help base articles, both publicly available as well ones requiring account registration to access (see, e.g., block 128). The training articles are first labelled using TOOL 1's automated labeling tool (the "labeling tool"). The labeling tool is an NLU-based tool that is capable of processing a given help base article and labelling it with relevant labels, including digital product type, device interface labels (e.g. applicable devices, applicable operating system(s), including version(s)), self-help task name ("task title"), etc.

The labeling tool is specifically designed to work on help base articles. The labeling tool uses multiple resources for applying labels to given help base articles, including:

1. NLU processing of the help base article to search for text that is formatted as title headings, webpage titles, etc. (used for task title labels);

2. NLU processing of the help base article to determine what are the applicable computing devices (e.g. desktop, laptop, mobile device, etc.), operating systems (e.g. Windows operating system, Apple Mac operating system, iOS, Android OS, etc.), web browsers (Google Chrome, Mozilla Firefox, Apple Safari, Microsoft Edge, etc.), and other user interface parameters, including alternate versions of devices, operating systems, and browsers, are applicable for the article—by searching for identifying text, headings, URL types, contextual elements, etc. (used for device interface labels);

3. NLU processing to determine the digital product category types for the website, software application, mobile app or other digital product being processed (e.g. e-commerce website, streaming video app, news media website, banking/finance website, cloud application (e.g. Dropbox or Airtable), travel booking app, email client, social media website, etc. (used for digital product category labels);

4. Comparison to directories of websites, software applications and other digital products which group similar websites/products by similarity or type (used for digital product category labels);

5. Comparison to a search ranking, list, database or other resource containing the most commonly requested or searched customer service help tasks for the applicable digital product category. Such search rankings/lists may be accessed automatically by TOOL 1, or the information may be manually added to the NLU algorithm (used for task title labels);

6. The proposed help base article labels from the labeling tool may also be verified and/or error-checked manually by a human operator or other attendant who assesses the automated titles for appropriateness until the model has few or no errors (used for all label types).

TOOL 1's training is enhanced by applying its labeling tool to a wide variety of help base articles, thereby labelling them with digital product type labels, device interface labels, task title labels, etc.

TOOL 1's training is enhanced using automated NLU processing of a wide variety of help base articles which have been labeled using the labeling tool. TOOL 1 converts the natural language text and iconography of a help base article into an action script, or list of actions that are mandated by each of the steps and directives contained in that help base article. These recommended actions are converted to a digital recording of steps that are recorded using the same parameters and Action types that are recorded by TOOL 1's action recorder, including any applicable action loci.

TOOL 1 automatically runs a test of each recorded action script by executing the actions listed in the action script in their specified order. The text execution is done on the device, operating system, and/or web browser specified in the device interface label of the help base article (i.e. if possible, using the same version of the device/operating system/browser in the label). TOOL 1 may use an already existing software simulator to execute the action script, where the simulator simulates the behavior of a particular device, operating system, web browser type, etc., e.g., including specific versions of those such devices, operating systems or web browsers.

If the text execution of the action script runs to completion with no overt errors, the action script is annotated as a validated action script (see, e.g., block 128). Overt errors include: display of "error" text in the GUI window, application crashes, action loci missing from GUI, failure for GUI to progress to a new state, etc. Any action script with overt errors is flagged as faulty (see, e.g., block 130), in which case TOOL 1 (and TOOL 4 below) can be engaged to autonomously work to identify the step or action that results in the error, and then autonomously attempt alternate steps or actions to try to complete the task. Once any errors have been corrected and the action script can be brought to completion on an error-free basis, the action script in question is marked as a validated action script. See, e.g., block 132.

Operation of TOOL 1.

The operator of TOOL 1, or in other aspects, an automated computing instruction or application, selects a given help base to process.

TOOL 1 converts the natural language text and iconography of all accessible help base articles in the given help base into action scripts, or lists of GUI and/or non-GUI actions that are described by each of the steps and directives contained in that help base article. This action script is then digitally recorded onto a computer or computer server device. Reference is made to FIG. 1A, block 104.

TOOL 1 records the action script steps mandated by the given help base article in a format consistent with the intended type or types of computing or digital devices and/or web browsers identified in the article's device interface label.

The recorded actions may include the GUI actions and non-GUI actions, such as the ones listed above for the action recorder tool.

Recorded action steps may include action loci information if applicable, i.e. the precise or general location on the GUI where the action should be executed or initiated, as well as other identifying features indicating where an action should take place, e.g. the text string to be clicked, the button to be checked, the box for entering text, the link to be selected, etc.

For each step listed in the given help base article, TOOL 1 records completion criteria to assess when or if a step has been successfully completed. The completion criteria for each step is be based on the NLU processing of the step in the help base article being performed, as well as steps after the step being performed, as well as general completion standards, e.g. website doesn't crash, GUI doesn't display an error message, website doesn't display a "404 error", etc.

The action scripts and action loci are saved into a database entry that is identified with the help base article being processed (e.g., see FIG. 1A, block 104). TOOL 1 also adds any label information derived by the labeling tool, including digital product type, device interface labels, task title, etc. (Reference is made to FIG. 1A, blocks 104 and 106.) Finally, TOOL 1 also records the original text of the help base article, which is included in the database in order to facilitate ongoing training of the NLU algorithms used in TOOL 1, and in TOOLS 2, 3, 4, 5 and 8 below.

TOOL 1 is trained to automatically crawl through the given help base and identify help base articles, by testing all linked pages within the help base. The articles may range from simple "Change my password" and "See my current subscription" tasks to very sophisticated tasks.

After converting and recording the action script derived from each help base article task, TOOL 1 automatically runs an execution of the recorded actions on the relevant type of computing device (or an interface which can simulate such computing device). For each step in the action script, TOOL 1 is given automated control of the device or simulator so that it can automatically operate and/or manipulate the applicable GUI and non-GUI controls, and then it performs the action required. After taking each action, the tool assesses whether the completion criteria for the given step have been achieved. If the completion criteria have been achieved, the tool moves on to the action required in the following step in the action script. The tool repeats this process until it has achieved the completion criteria for all of the actions/steps called for by the article, or until there is a failure (i.e. the completion criteria are not achieved) (e.g., see, FIG. 1A, block 108).

If there is a failure, the tool flags the step for which the completion criteria cannot be achieved.

TOOL 1 also has an iterative resolution component which automatically searches for alternative routes for achieving the completion criteria. For example, if the completion criteria require that the user see the words "Reset Password" in the GUI, but those words are not currently be displayed, the tool searches the available hyperlinks in the then-current GUI state, including hyperlinks that require scrolling, to see if any of them take the user to a page that does display the required words. If an alternative route is successful, the tool annotates the originally failed action/step with a note that the alternate route can achieve the desired completion, and then enters the automatically derived alternate route in its place.

While running an execution of the sequence of actions, the tool automatically records at which step an error or completion criteria failure has occurred, including errors such as: (a) Bad links (e.g. hyperlinks that take a user to a webpage with no content, a "404 error", "Page Not Found", etc.); (b) Unexpected conditions errors, where the state of the computing device after execution of an action does not match the description of the step (e.g. the word "Settings" does not appear in the GUI screen even though the help base article expects it to); (c) Typos and grammatical errors; (d) Mismatches between the expected completion result and the actual result when an action/step is executed; and/or (e) Server failures or time-outs; and the like.

The recorded action scripts and action loci created by TOOL 1's machine learning algorithm (e.g., supervised learning algorithm) can be continually trained with automated adjustments and assessments, as well as those from human operators, to improve TOOL 1's NLU interpretations of the help base article text and TOOL 1's action loci searches. Individual action script and action loci recordings are also improved, enhanced and/or trained automatically by execution testing, e.g. if the action locus of a given step is not clearly described in the help base article, but TOOL 1 is able to locate the action locus while executing the action script, this additional information is added to the database record for this particular task.

For all tasks that are brought to successful completion by TOOL 1, the tool records the final successful action script, action loci, completion criteria, etc. into a master database for use in the ongoing training of the AI algorithms used in other tools described below (see, e.g., FIG. 1A, block 110).

TOOL 1 automatically provides a quality rating for individual help base articles based on machine-assessed parameters (see, e.g., FIG. 1A, block 110): dead links (failure); hard to find steps/links (ease of use); complexity of description (prolixity); and/or efficiency (number of steps).

TOOL 1 outputs a report with the quality ratings for each article in the help base. TOOL 1 may also provide error data, or additional help base data, as determined during a given iteration, for retraining of the NLU-based model.

TOOL 1 operates (e.g., read, analyzes, and/or interprets, and executes, tests and verifies) in all major languages, e.g., English, Mandarin Chinese, Hindi, Spanish, French, Standard Arabic, etc. In some aspects, processing of Data in help bases, related articles and/or other help-related media or content in various languages may be combined to generate recordings of action scripts in another or multiple languages. In this way, an action script recording may be generated, assembled and verified based on multiple, different languages, and, therefore, may be a new, more content-rich product than would have been created from a single language source.

TOOL 2: Tool for Autonomously and Automatically Generating Video Help Guides—Separate Window Video Mode.

TOOL 2 creates autonomously-generated animated screenshot help guides (each one a "help guide") derived from existing help base material, as well as from customer support help data created or generated by TOOLS 1, 4, 5 and 8 described herein. TOOL 2 takes the error-checked digital recordings/conversions (action scripts, action loci and labels) which have been created by TOOL 1 from existing help base material, and then converts them into animated help guides.

TOOL 1 uses a customized NLU algorithm to extract the actions required to complete a given task covered by a given help base article. The steps are recorded by the tool as an action script with action loci, which is a digital record of all the steps required for completing the overall task. These digital records are kept in a database.

TOOL 2 accesses the action scripts database which has been populated as described for TOOL 1, and then executes the sequence of recorded actions recorded in a given action script. While executing those actions, TOOL 2 also simultaneously records a screenshot from the GUI of each step within the action script.

Figure 2A:
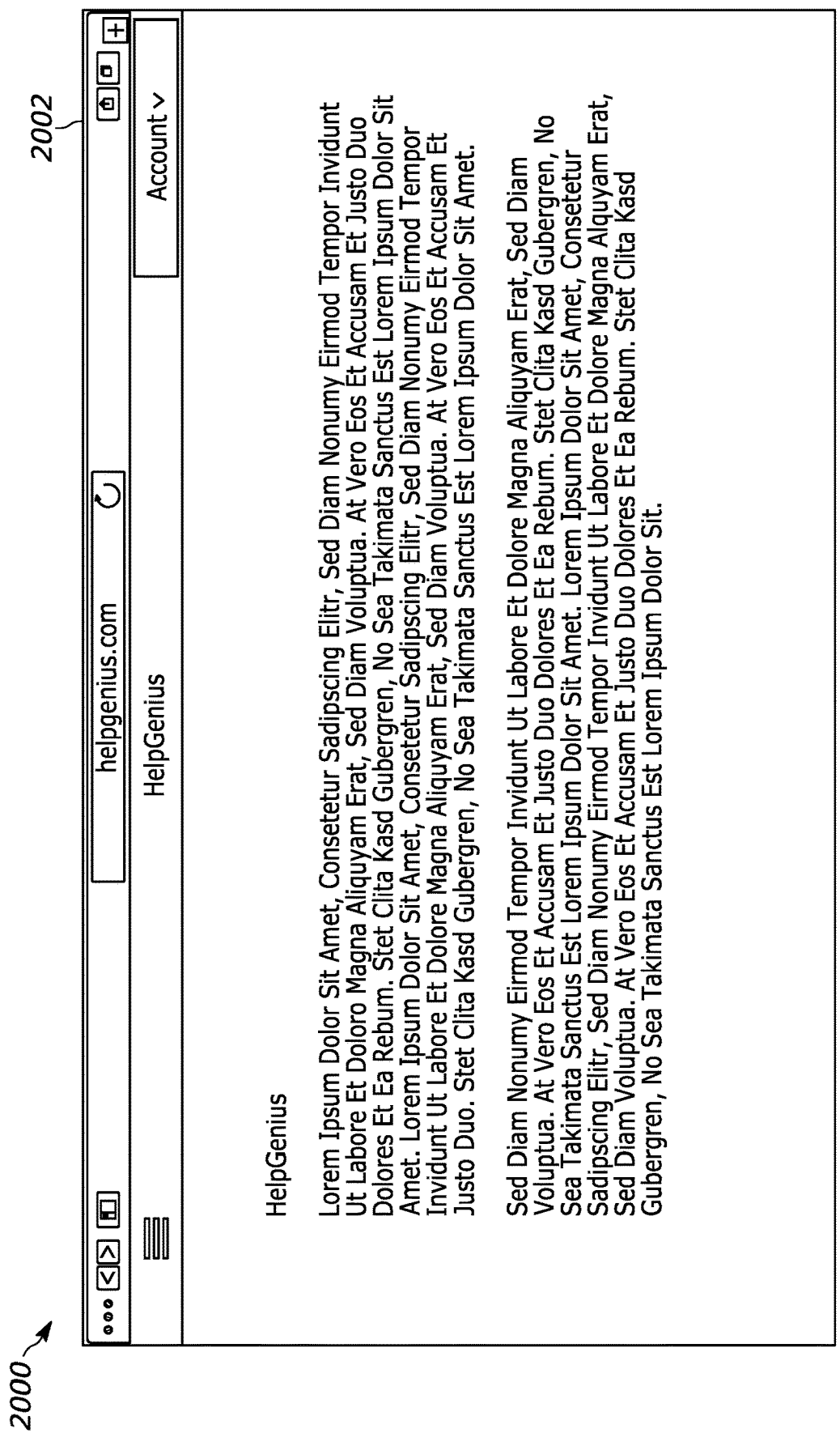
FIG. 2A illustrates an example GUI in accordance with various aspects disclosed herein.

The screenshots recorded by TOOL 2 are taken from the GUI representation of the actual—or otherwise real or live—interface that an actual customer/user of the website, app, software application or other digital product would be viewing or would otherwise experience (see, e.g., FIG. 2A, GUI 2000 and graphic 2002). TOOL 2 uses the device interface label information derived by TOOL 1 to assess which interface to use, including the correct version information (e.g. for operating system versions, software application versions/builds, devices with different versions/models, web browser types and versions, etc.) to ensure that the screenshots reflect the actual experience of an end-user.

TOOL 2 then daisy-chains (i.e., puts in sequence) these GUI screenshots together to produce an animated sequence or video covering the task from start to completion (see, e.g., FIGS. 2A through 2O, GUIs 2000 through 2140). In particular, FIGS. 2A-2O illustrate example GUIs in accordance with various aspects disclosed herein.

Figure 2B:
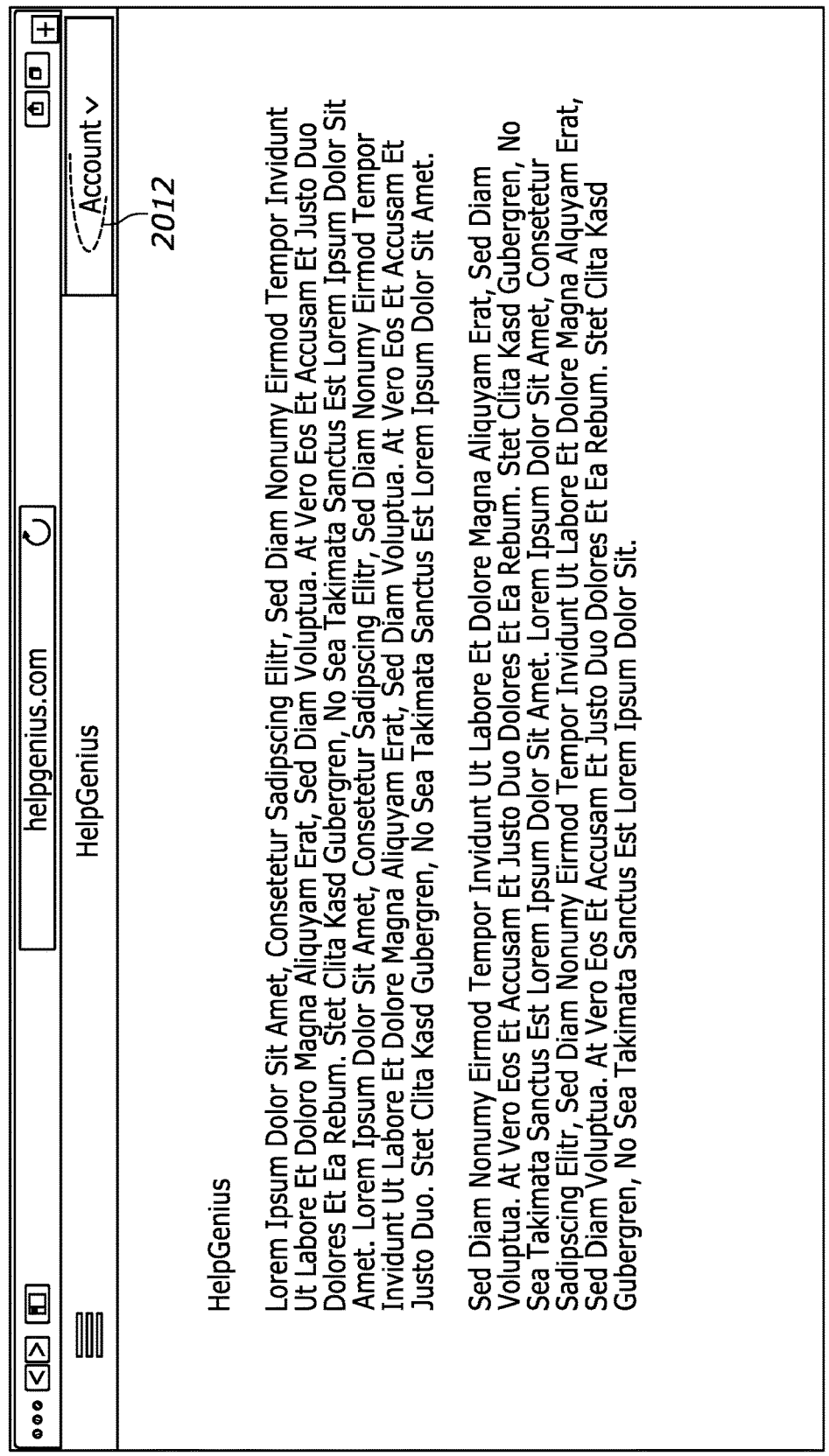
FIG. 2B illustrates a further example GUI in accordance with various aspects disclosed herein.
Figure 2C:
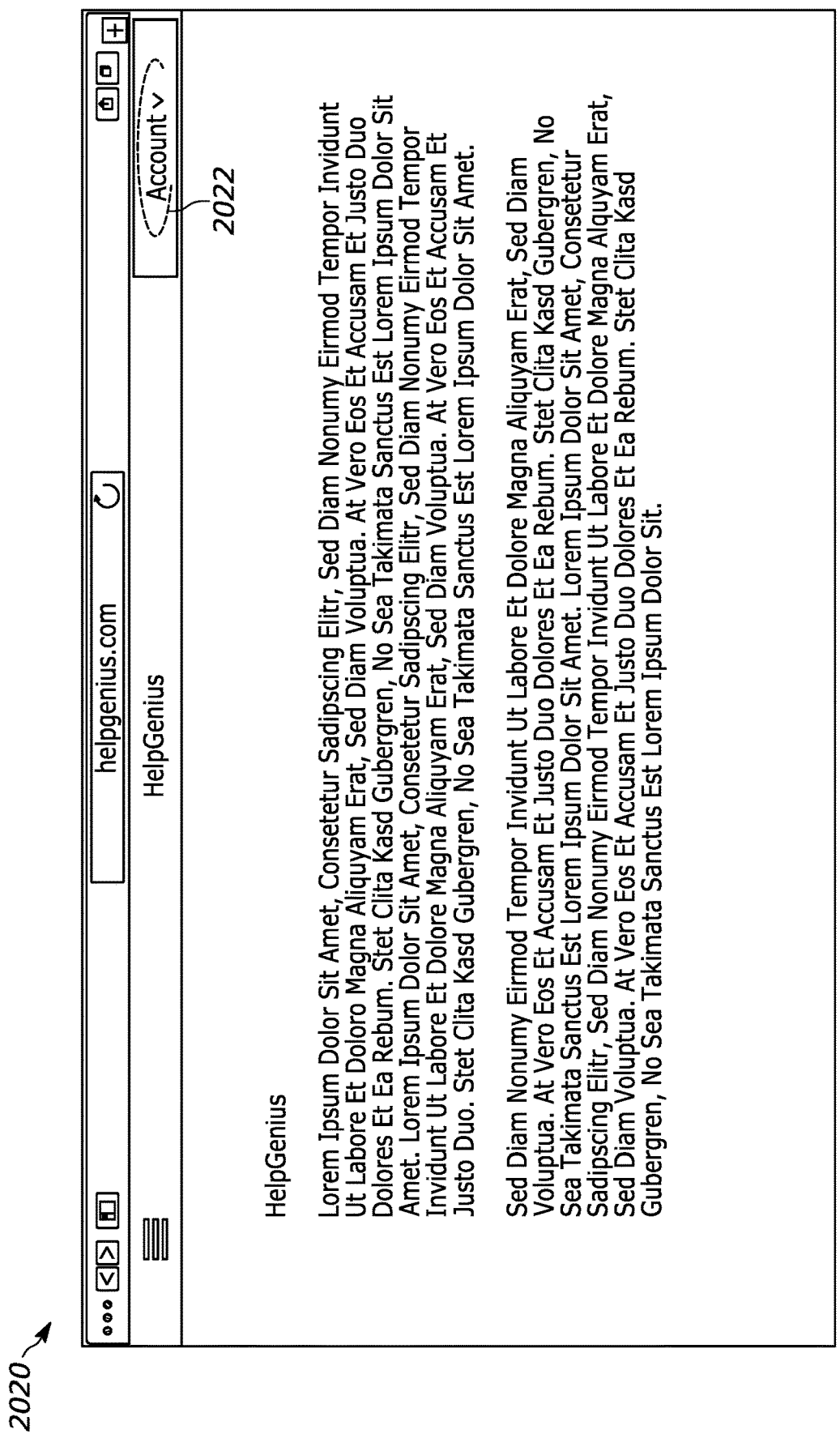
FIG. 2C illustrates a further example GUI in accordance with various aspects disclosed herein.
Figure 2D:
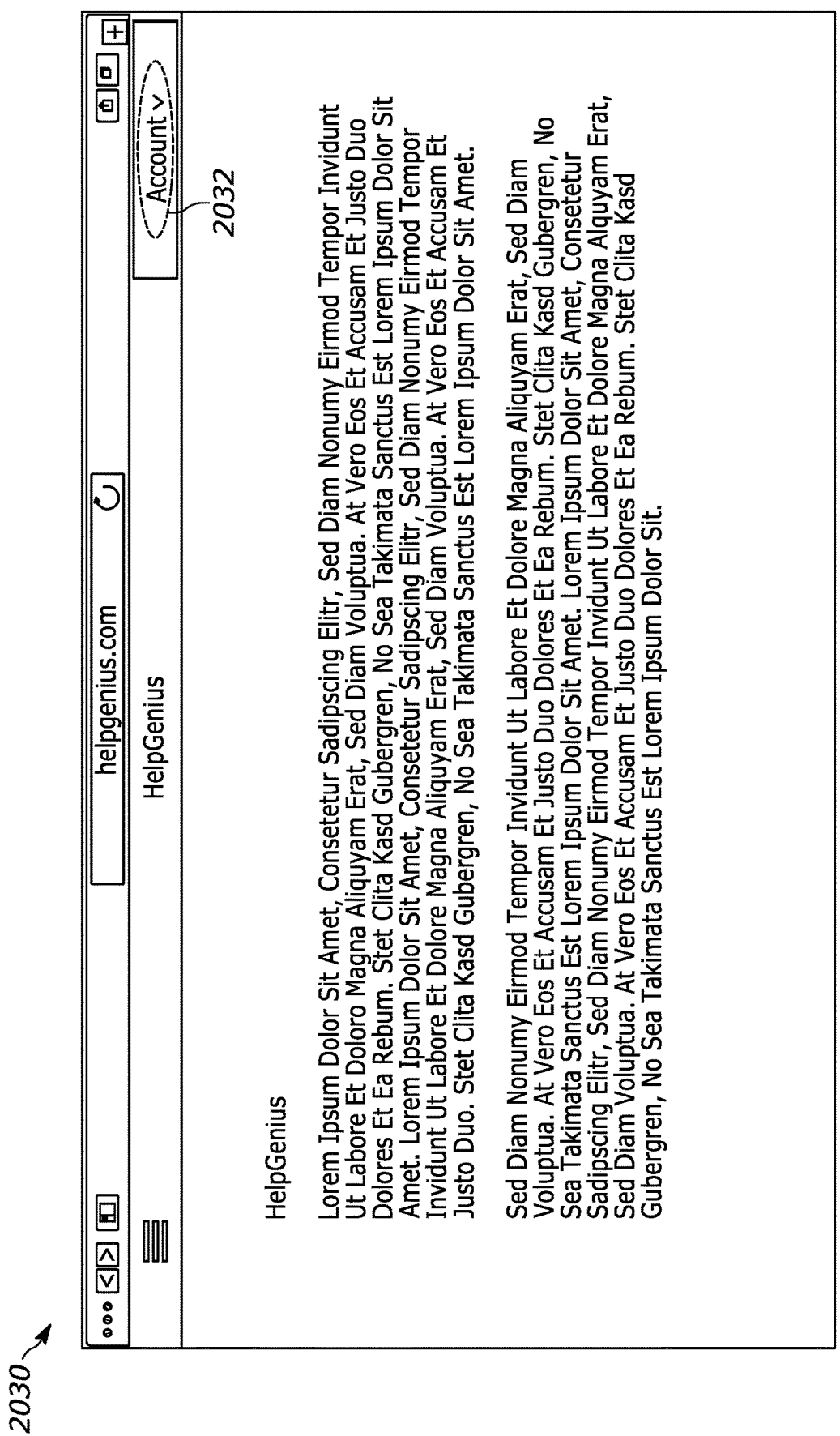
FIG. 2D illustrates a further example GUI in accordance with various aspects disclosed herein.
Figure 2E:
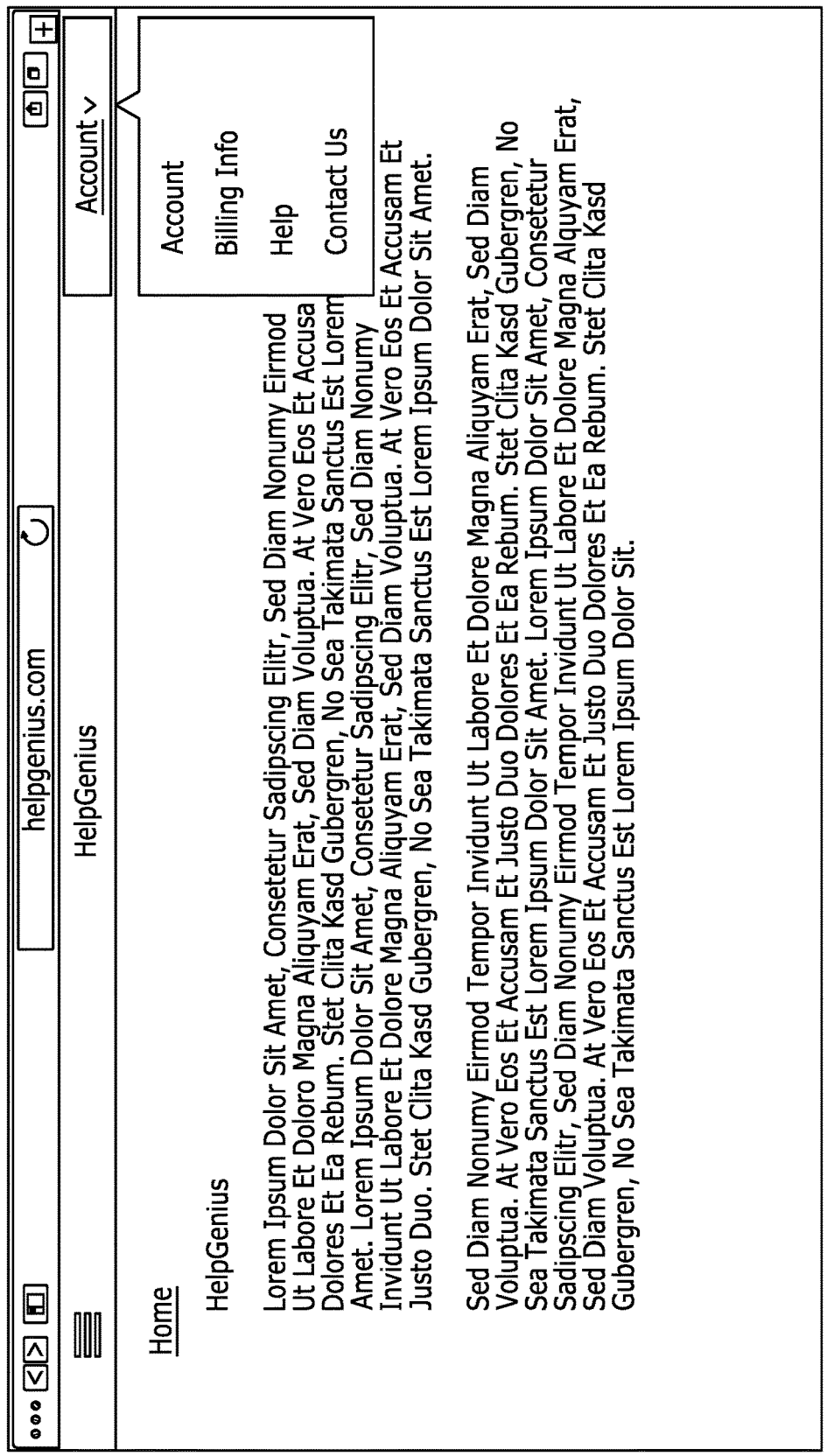
FIG. 2E illustrates a further example GUI in accordance with various aspects disclosed herein.
Figure 2F:
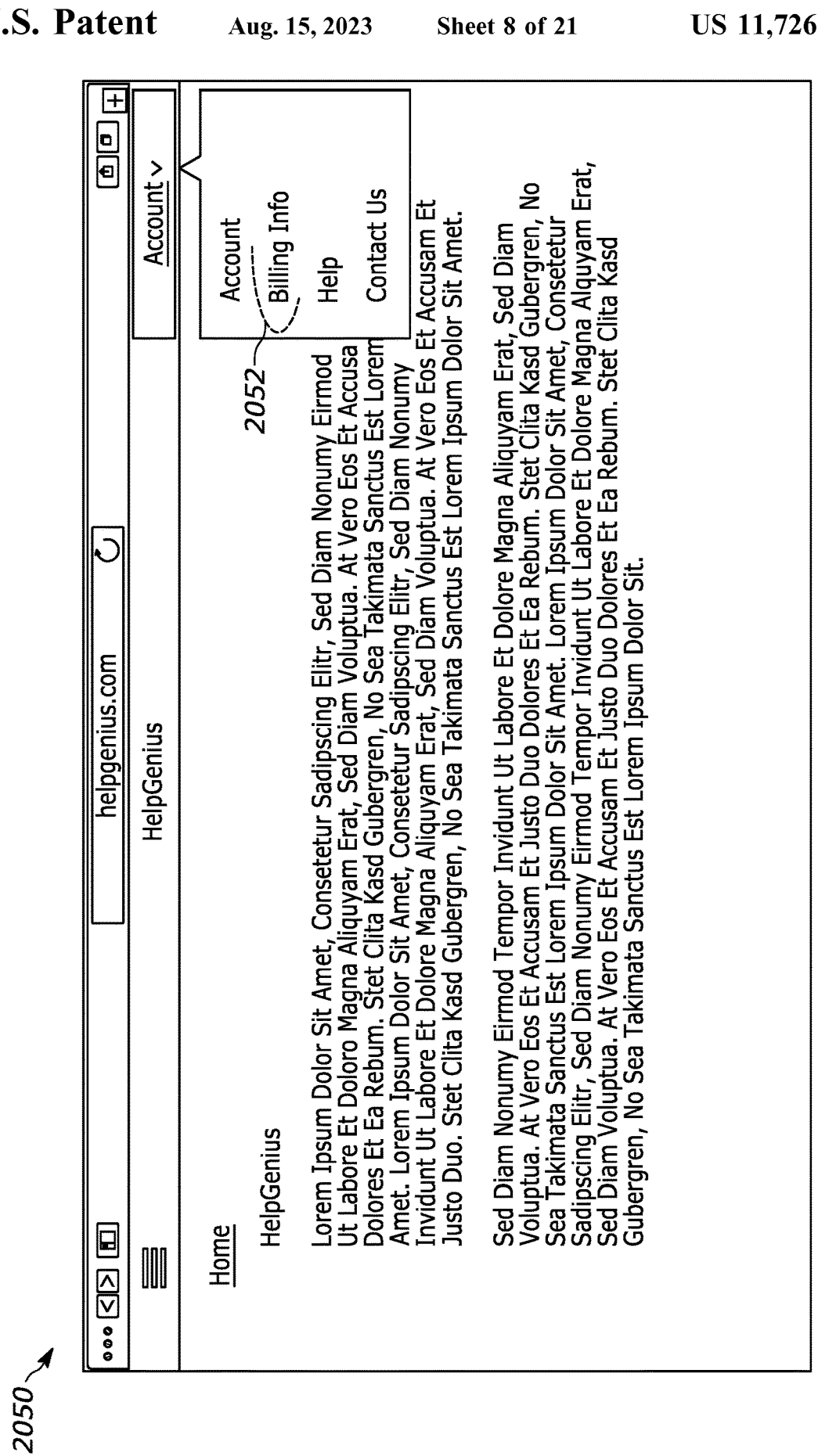
FIG. 2F illustrates a further example GUI in accordance with various aspects disclosed herein.
Figure 2G:
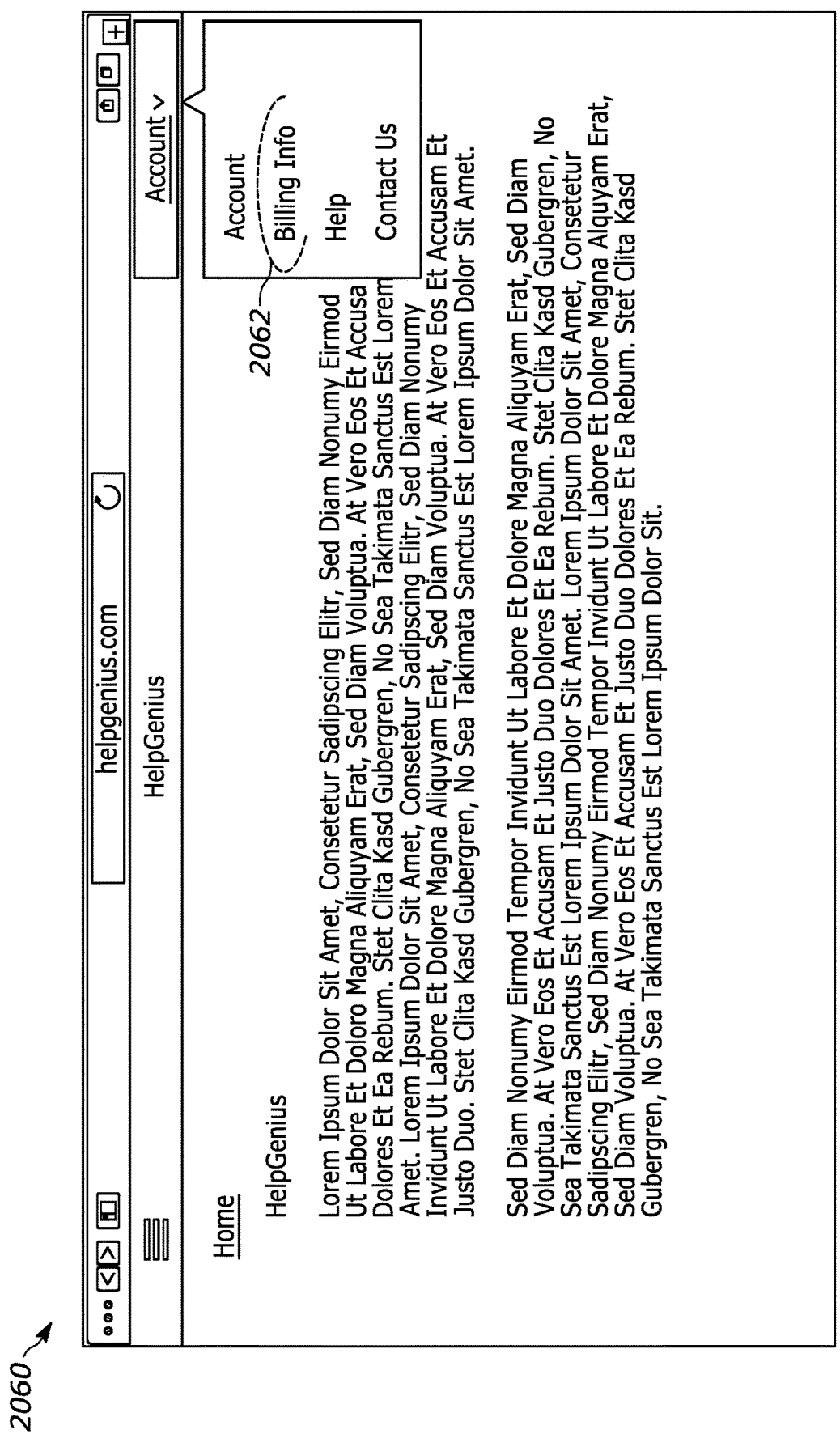
FIG. 2G illustrates a further example GUI in accordance with various aspects disclosed herein.
Figure 2H:
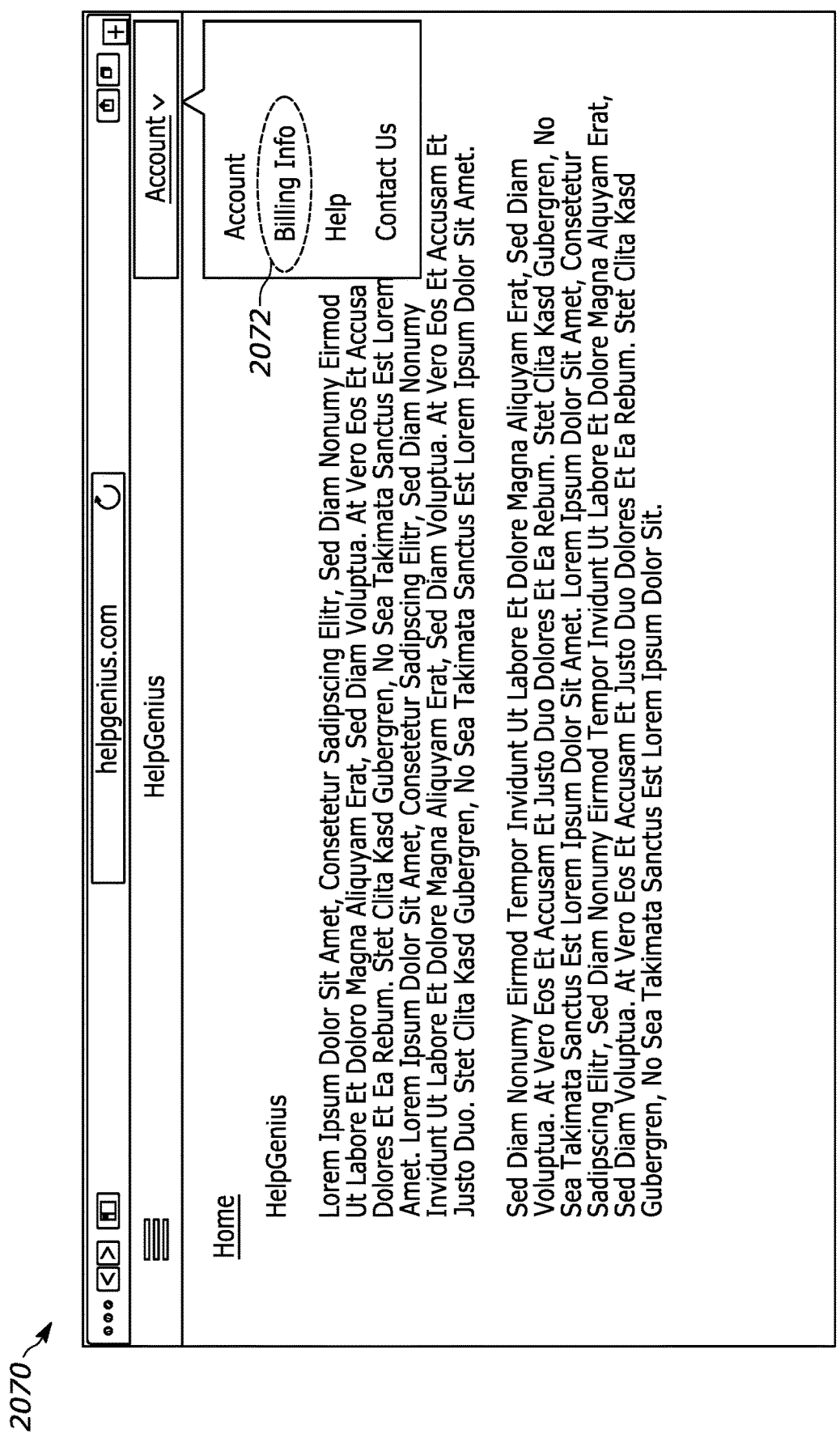
FIG. 2H illustrates a further example GUI in accordance with various aspects disclosed herein.
Figure 2I:
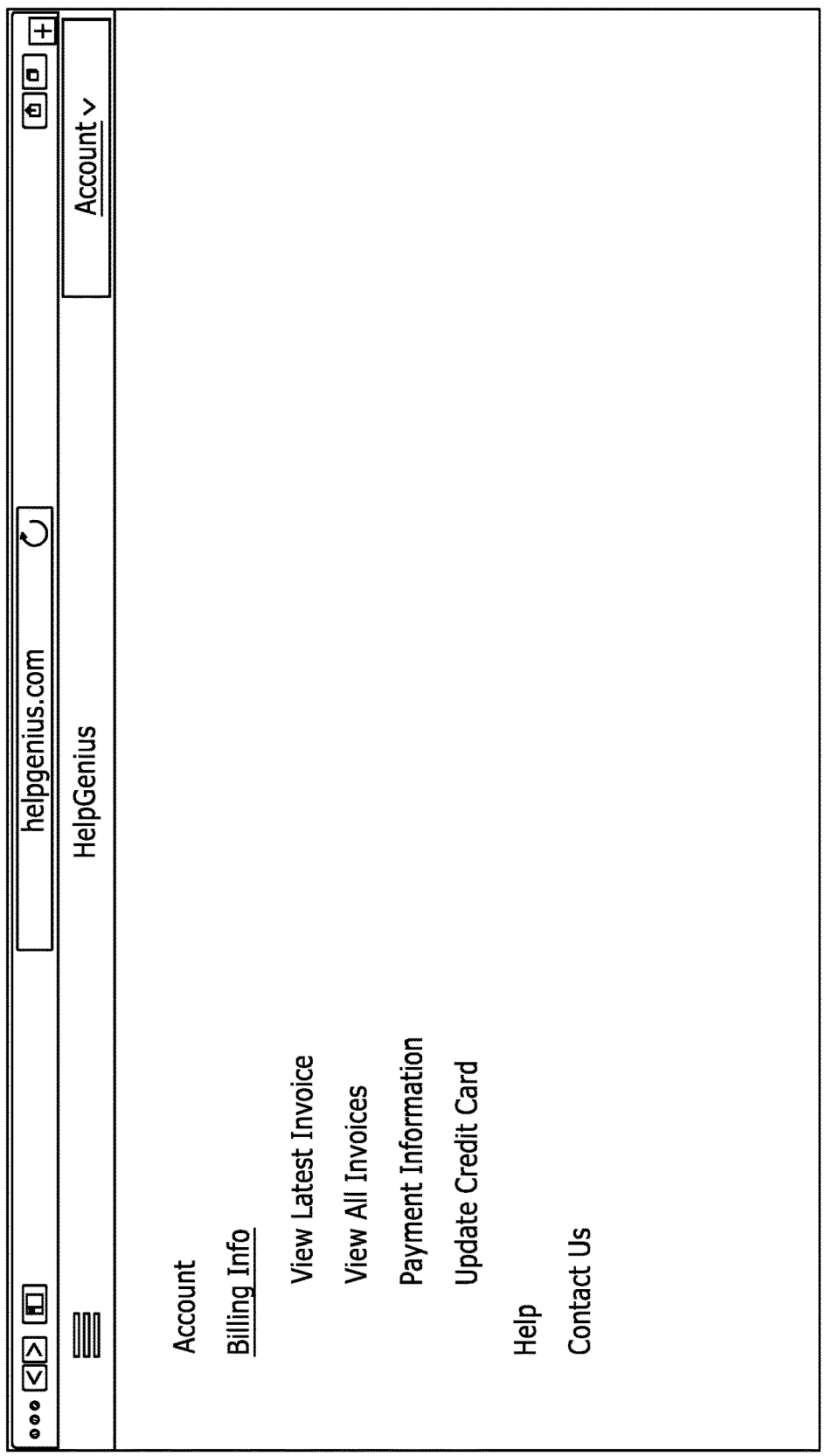
FIG. 2I illustrates a further example GUI in accordance with various aspects disclosed herein.
Figure 2J:
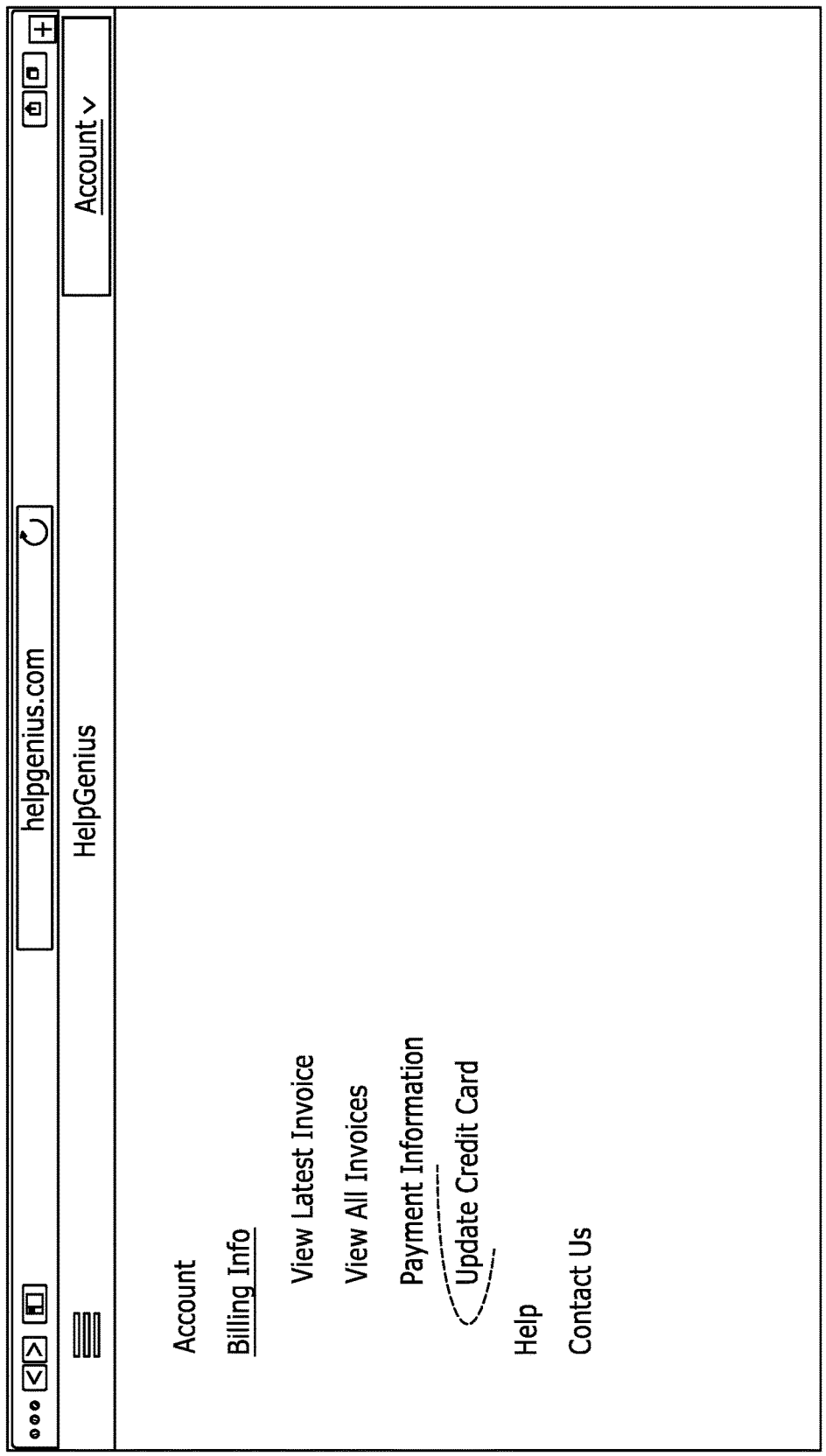
FIG. 2J illustrates a further example GUI in accordance with various aspects disclosed herein.
Figure 2K:
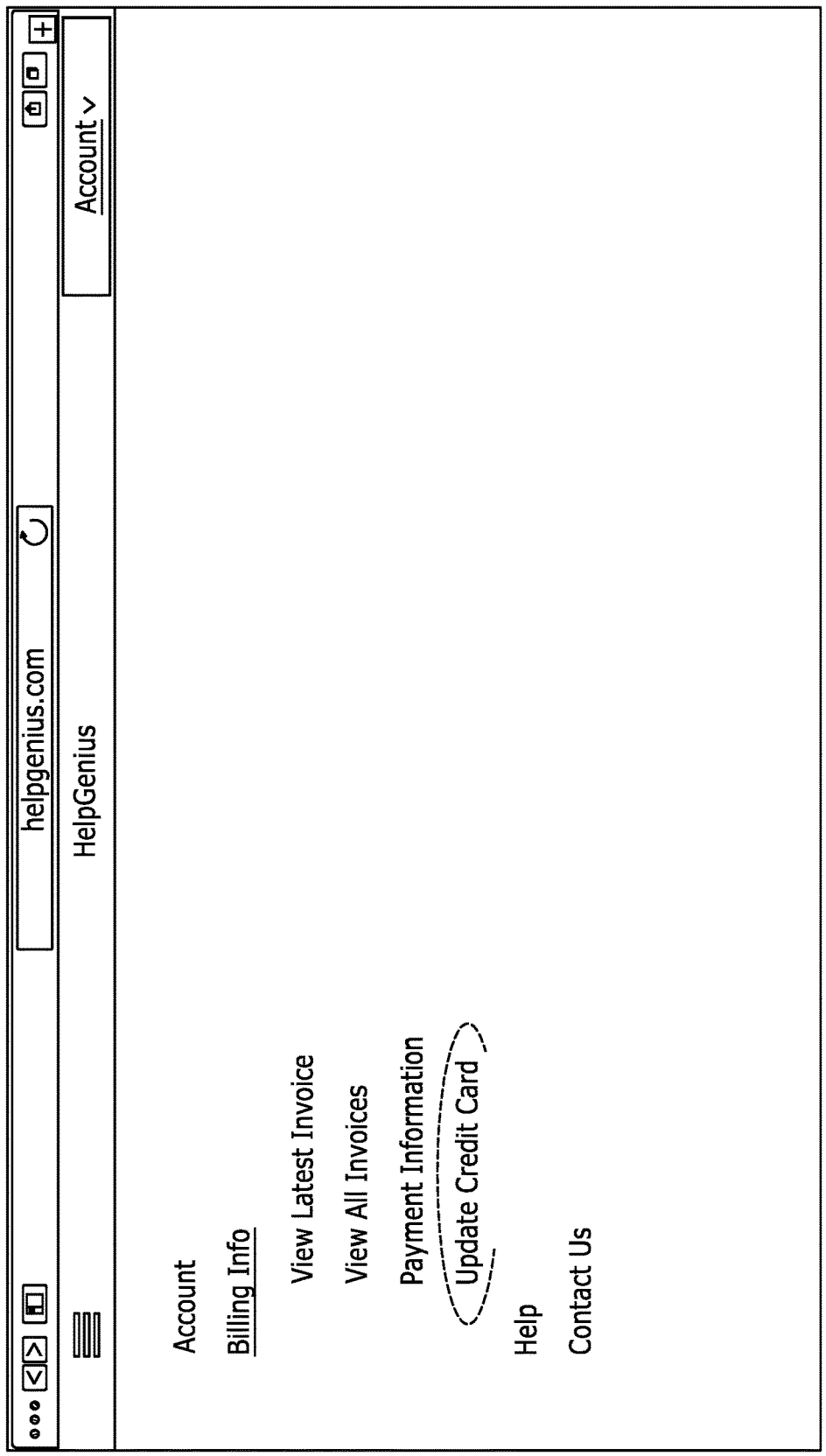
FIG. 2K illustrates a further example GUI in accordance with various aspects disclosed herein.
Figure 2L:
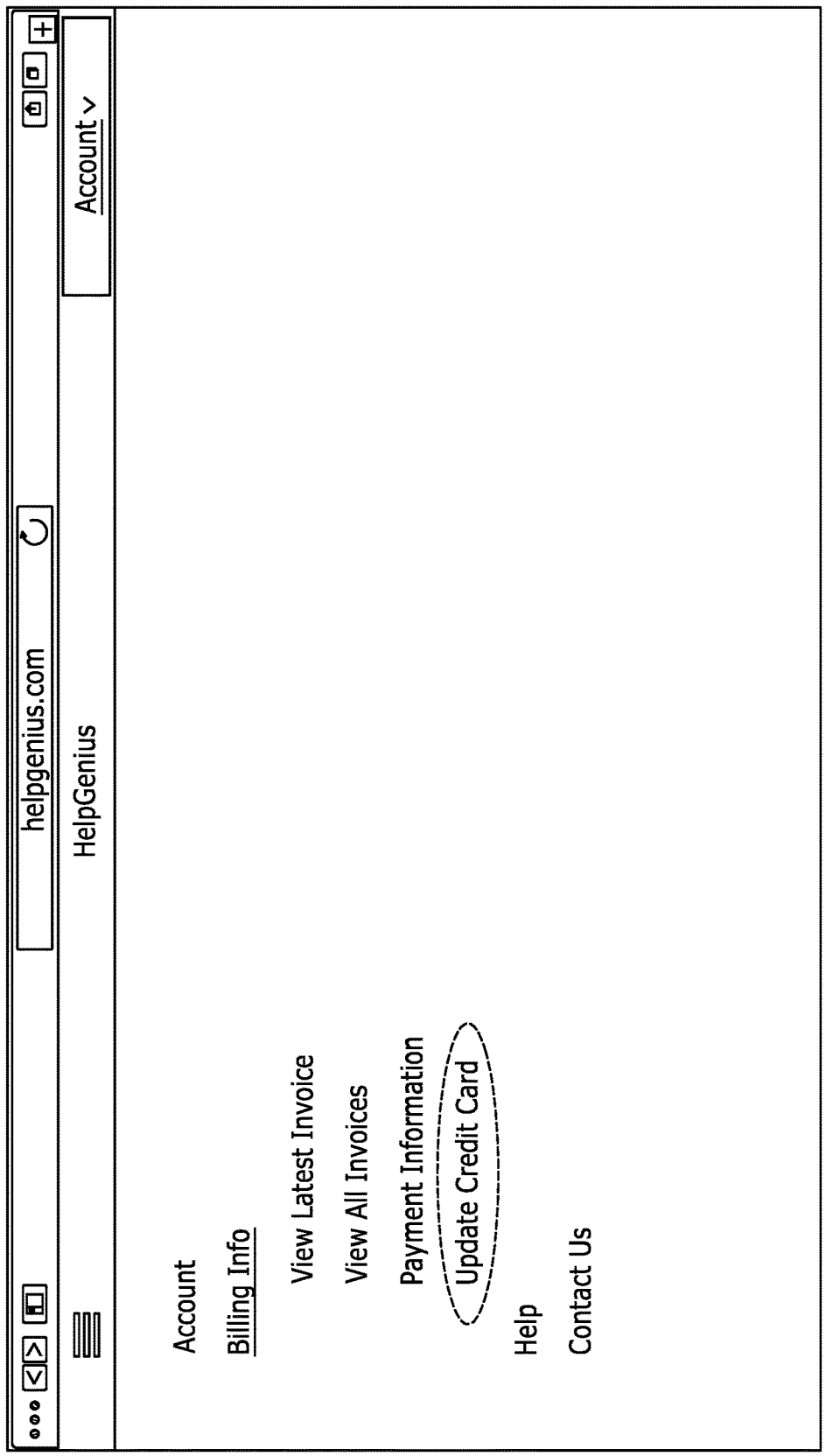
FIG. 2L illustrates a further example GUI in accordance with various aspects disclosed herein.

Using the registered action script as directions, TOOL 2 has an automated graphics overlay tool which overlays animated graphics over the animated sequence to highlight any relevant action loci and clarify actions to be taken. These graphics may include blinking halos, blinking or non-blinking text, enlarged call-out icons, animated arrows, or other circular or oval marks. For example, a halo may be used to encircle a hyperlink that needs to be clicked (see, e.g., FIG. 2B depicting GUI 2010, FIG. 2C depicting GUI 2020, and FIG. 2D depicting GUI 2030, and respective graphics 2012, 2022, 2032), or an enlarged version of an icon is overlaid on the GUI to show the correct icon to click on. Another example is shown for FIG. 2E depicting GUI 2040 and graphics 2052, 2062, and 2072 of each FIG. 2F depicting GUI 2050, FIG. 2G depicting GUI 2060, and FIG. 2H depicting GUI 2070, respectively. Yet a further example is shown for FIG. 2J depicting GUI 2080 and graphics of each FIG. 2K depicting GUI 2090, FIG. 2L depicting GUI 2100, and FIG. 2M depicting GUI 2110, respectively. The graphics are overlaid on each screenshot to highlight the action locus and explain or clarify the next step/link/action required to complete the desired task (see, e.g., FIGS. 2A through 2O, GUIs 2000 through 2110).

TOOL 2 has a GUI assessment tool to determine the colors and locations of the text, images and backgrounds displayed by the GUI. The animated graphics and text generated by the graphics overlay tool are automatically located in positions that minimize the obstruction of elements in the existing screen displayed by the GUI, and are presented using colors which contrast with (i.e. stands out from) the background areas of the screenshot to further ensure legibility. (For example, see FIG. 2O, graphic 2140.) If the animated help graphics/text covers text or images of the underlying GUI window, the help graphics/text is created with partial transparency. See, e.g., FIGS. 2A through 2O, GUIs 2000 through 2142.

The resulting help guide screenshot videos created by TOOL 2 can be presented in a video format within the GUI display of a computing device, e.g. in a separate window on the user's device (i.e. separate from the window displaying the digital product being used. This is called "Separate Window Video" mode.

This process is repeated for all convertible articles in the given help base.

The help guide screenshot videos also have some or all of the following features:

(a) Voiceover narration (e.g., using its NLU algorithm, the tool converts selected text from the given help base article into voiceover text);

(b) Pause-able (e.g., the viewer can pause the video playback at any time);

(c) Zoom-able (e.g., the viewer can zoom in for greater detail on an area of the video);

(d) Custom-branding (e.g., an enterprise client can present its help guide(s) with a related company logo and/or branding);

(e) The help guide videos can be delivered as pop-up/pop-over screen over or be built into an enterprise client's website/app;

(f) The help guide video window can also be made available using an internet web browser (e.g., Microsoft Edge, Google Chrome, Apple Safari, Mozilla Firefox, etc.) plug-in or extension. Once a web browser user has added the help guides plug-in, the web browser will provide a GUI button that will activate the plug-in, launching a separate GUI window which will show a list of help guide videos available that are applicable to the help base or website that the user is viewing;

(g) Send-to-another-device link: the viewer can send a link for the help guide video to another device so that he or she can view the video while executing the action script steps on the original device. The video link can also be sent to a user by a customer service support representative, via email, mobile phone text message, chat message, or other text communication medium; and/or (h) The videos can be played in standard video play mode, or in step-by-step control mode—to go forward or backward by incremental steps.

TOOL 2 operates (e.g., read, analyzes, and/or interprets) in all major languages, e.g., English, Mandarin Chinese, Hindi, Spanish, French, Standard Arabic, etc. In some aspects, processing of Data in help bases, related articles and/or other help-related media or content in various languages may be combined to generate a single help guide video in a different language. In this way, a help guide video or media content may be generated based on multiple, different languages, and, therefore, may be a new, more content-rich help guide that would have otherwise not been created from resources available for a single language.

TOOL 3: Tool for Autonomously and Automatically Generating User Help Guides—"Mark-up" or Overlay Mode.

TOOL 3 is similar to TOOL 2 in that it also autonomously generates and/or provides guides which visually present customer service help guidance, and like TOOL 2, it uses both help base articles converted by TOOL 1 and other customer service resources, including those generated by TOOLS 4, 5 and 8 described herein. But instead of creating an animated video guide that can be viewed in a separate window, TOOL 3 creates animated help guide graphics and text that are overlaid directly onto the GUI window where the website, mobile app, software application or other digital product, is being displayed. Using this approach the help guide can instruct or direct the user in real-time.

TOOL 3 accesses the database entries created and recorded by TOOL 1, as well as those generated by TOOLS 4, 5 and 8 described herein, to have ready access to the previously processed customer service help resources for a wide variety of websites, mobile apps, software applications and other digital products. These database entries, as created by TOOL 1 and described above, may include, among other things, action scripts, action loci and label information (e.g., including, among other things, digital product categories, digital product type labels, device interface labels, task title labels, etc.).

TOOL 3 is designed to be contextually relevant. Using previously existing programming tools, it automatically detects the type of device, operating system, web browser, etc. being used by a prospective viewer or user of a help guide. TOOL 3 will only offer and/or display a help guide to a prospective viewer/user if there is a help guide available in its database where: (1) the device interface labels are applicable to the prospective viewer/user, taking into consideration the user device, operating system, web browser, etc., and (2) there are help guides available for the website, mobile app, software application or other digital product (a "digital product") being used by the user/viewer.

TOOL 3 can be activated by the user of a digital product, by clicking on a GUI button, hyperlink or icon (the "Show Me How" button). Several options and/or configurations are available, as described below.

Option 1.

One example option is embedding a GUI button (e.g., Show Me How button) into the customer support offerings within the interface of the digital product itself. Such option can be implemented by the developer/creator/owner of the digital product and embedded into the digital product). Such embedded Show Me How button can be presented to a user of the digital product by displaying it (i) on the same page or GUI area as a related help base article; (ii) via a live chat window (e.g., attended by a human customer support representative); (iii) via an automated chat window (e.g., operated autonomously and not directly attended by a human customer support representative); (iv) inside an email or text message sent by a customer support representative; (v) inside of an automated interactive customer support questionnaire; as well as (vi) other modalities for implementation. Under these Option 1 scenarios, the Show Me How button can be subtitled with the name of the support task to be performed (e.g. "Adjust my audio settings", "Download an account statement", "Change my credit card info", etc.). The subtitles are derived from, and/or abbreviated versions of, the task title label in the database. When the customer/user clicks the Show Me How button, TOOL 3 will proceed with the execution of the given support task, as described below.

Option 2.

As a further option, the Show Me How button can be delivered via a web browser (e.g. Microsoft Edge, Google Chrome, Apple Safari, Mozilla Firefox, etc.) plug-in or extension. First, the user must download and install or otherwise enable the Show Me How browser extension/plug-in. Then, when the user visits a website which has help guides available, the user will have the available option of clicking or tapping the extension/plug-in GUI button within the browser's GUI to activate TOOL 3. Clicking the GUI button launches a pop-up window, or other GUI interface, where the user can access the help guides available for the website being visited, e.g. the user can type in their customer support inquiry and see a list of help guides available, or they can search the help guide database for a topic, etc. Once the user finds the customer service or help task they would like to execute, they can select/click/tap the desired task to initiate the execution of the task, as detailed below.

Option 3.

As a further option, a prospective user/viewer can download a standalone desktop or mobile application which will provide access to the library of Show Me How help guides. When activated, this standalone application has the ability to produce animated graphics which are overlaid on the GUI interface window of the software application or mobile app in question.

Once a Show Me How task is activated/initiated, TOOL 3 references the action script recordings in the database for the given task. Using the action script, TOOL 3 prepares the user for execution of the first action in the action script in real-time. For example TOOL 3 may search the GUI, including any hidden areas (i.e. areas or portions of a display, window, or screen not currently displayed by the GUI, but accessible by scrolling or un-hiding areas of a window), for the area of the GUI where the first recorded action is to be performed, such searching for a hypertext text link, symbol, text or number entry box, button or toggle switch, etc. (the "action locus"). In one example, if the first step in the help task includes the text (or audibly describes) "Go to your Account Info page", TOOL 3 searches the active GUI window for the correct action locus that corresponds to text "Account Info." If needed, TOOL 3 uses scroll command(s) to manipulate the active GUI window in order to make the next action locus visible. TOOL 3 may require that a user provide authorization via user settings or set-up dialog to allow it to control or manipulate any GUI controls.

TOOL 3 then uses a graphic overlay (clarifying text or mark-up animation) which is overlaid on the active GUI window to highlight or indicate the action locus within the digital product GUI where the first (or upcoming) action is to be undertaken (i.e. clicked on, tapped, data entered, controls adjusted, etc.) TOOL 3 has an algorithm/tool which detects the background GUI text and background colors, as well as other background contextual elements. Using this algorithm, TOOL 3 can ensure that the graphic overlay or mark-up animation is contextually appropriate for, or otherwise corresponds to, the background displayed by the GUI. For example, where appropriate, the graphics will use a color that contrasts with the background color or a webpage being displayed by a web browser; or if the graphics overlay is covering text or images in the underlying GUI window, the graphics will have some degree of transparency; or if TOOL 3 needs to display explanatory text, it will place the text in a location of the GUI where there is no other underlying text and use an arrow call-out graphic to connect the text to an action locus, etc. For example, see FIGS. 2N and 2O, GUIs 2132 and 2142. The type of overlay is also correlated to the type of action locus and the type of action to be taken, including the graphics used by TOOL 2, e.g. blinking halos, blinking or non-blinking text, enlarged "call-out" icons, animated arrows, or other circular or oval marks. For example, an animated halo or circle will encircle an action locus hypertext link like "Account" or "Billing Info". For example, see FIGS. 2B through 2H, graphics 2012 through 2072.). Alternatively, an arrow symbol with clarifying text will direct a user to perform a text entry action: "Enter new credit card information here" (see example at FIG. 2N depicting GUI 2120 and FIGS. 2N and 2O depicting graphics 2132 and 2142 of GUI 2130 and 2140, respectively).

TOOL 3 does not actually perform the action called for in the action script. It merely indicates or shows the action to be taken using the graphics and text overlays, but then waits for the user to actually perform the specified action (clicking, tapping, selecting, text entering, etc.). However, as an alternative, a user may select an option whereby TOOL 3 proceeds autonomously to complete each of the steps in the action script, and only waits for inputs that only the user can provide.

Once the user performs the action described/indicated by the overlaid graphics/text, TOOL 3 then reviews the resulting GUI state to confirm that the result of the action fulfills the completion criteria recorded by TOOL 1 for the action in question. If the completion criteria have not been met, then TOOL 1 presents a message directing the user to "go back" and re-try the previous step. For example, this "go back" message may be a textual message stating a directive to go backwards, e.g. "Hold on! Please click the back arrow to return to the previous step"; or the "go back" message may be a halo encircling the back arrow on the web browser. If the completion criteria are achieved, TOOL 3 repeats the process for the subsequent action in the action script. For example, TOOL 3 may then search the GUI for the action locus associated with the next action required to complete the overall task, and then highlight or indicate that next action locus. The process is repeated over and over until all the steps in the overall task are complete.

TOOL 3 operates (e.g., read, analyzes, and/or interprets) in all major languages, e.g., English, Mandarin Chinese, Hindi, Spanish, French, Standard Arabic, etc. In some aspects, processing of Data in help bases, related articles and/or other help-related media or content in various languages may be combined to generate a single help guide video in a different language. In this way, a Show Me How guide may be generated based on multiple, different languages, and, therefore, may be a new, more content-rich guide that would have otherwise not been created from resources available for a single language.

TOOL 4: Create Help Guides via Automated Crawling.

TOOL 4 expands on the experience and training of the NLU models used in TOOLS 1, 2 and 3. TOOL 4 takes the expertise of those three tools, but adapts them to automatically crawl through internet websites, mobile apps, software applications and other digital products to perform common customer service and technical support help tasks—without using any help base resources for guidance. TOOL 4 draws from the TOOL 1's broad universe of successful action scripts covering a wide range of help tasks, and applies these action scripts to novel input material ("novel inputs"), i.e. not previously processed websites, mobile apps, software applications, etc. Then TOOL 4 creates a new database entry for the novel input further expanding the "learned" universe, and thereby establishing a master database of action scripts, action loci, task title labels, device interface Types, etc. (the "master database"). Finally by applying TOOLS 2 and 3, TOOL 4 can autonomously output help guides for the novel inputs—without the need for consulting any dedicated/specific help base for guidance.

Training of TOOL 4.

TOOL 4 includes a machine learning neural network ("NN") that is related to, but distinct from, the NLU models used in TOOLS 1, 2 and 3. The TOOL 4 NN is trained, using both unsupervised learning and/or supervised learning, in three principal ways as described below.

TOOL 4—Training Method I.

Figure 3:
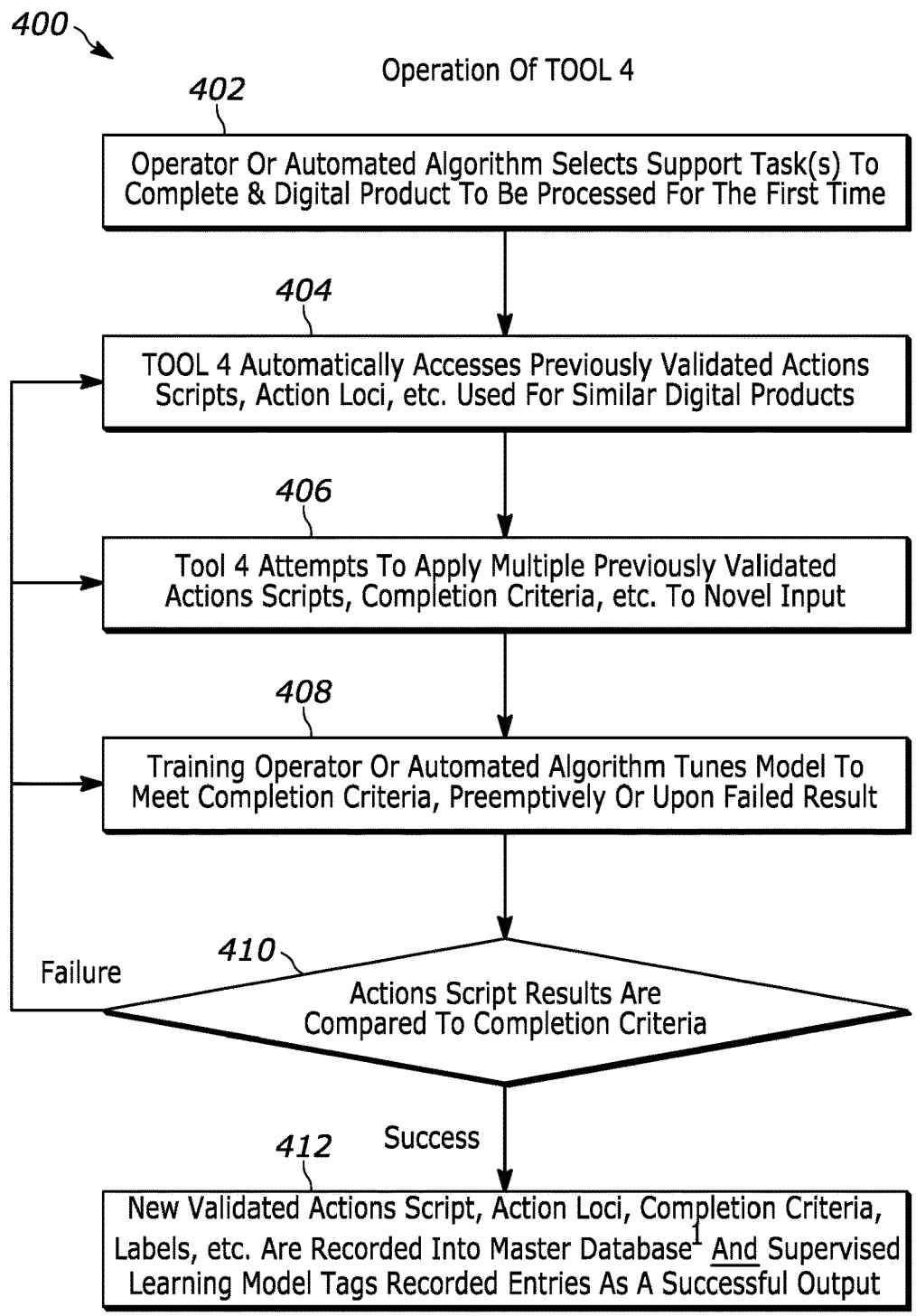
FIG. 3 illustrates a flow diagram of an exemplary method for receiving a novel input for training a second AI model, in accordance with various aspects disclosed herein.
Figure 4A:
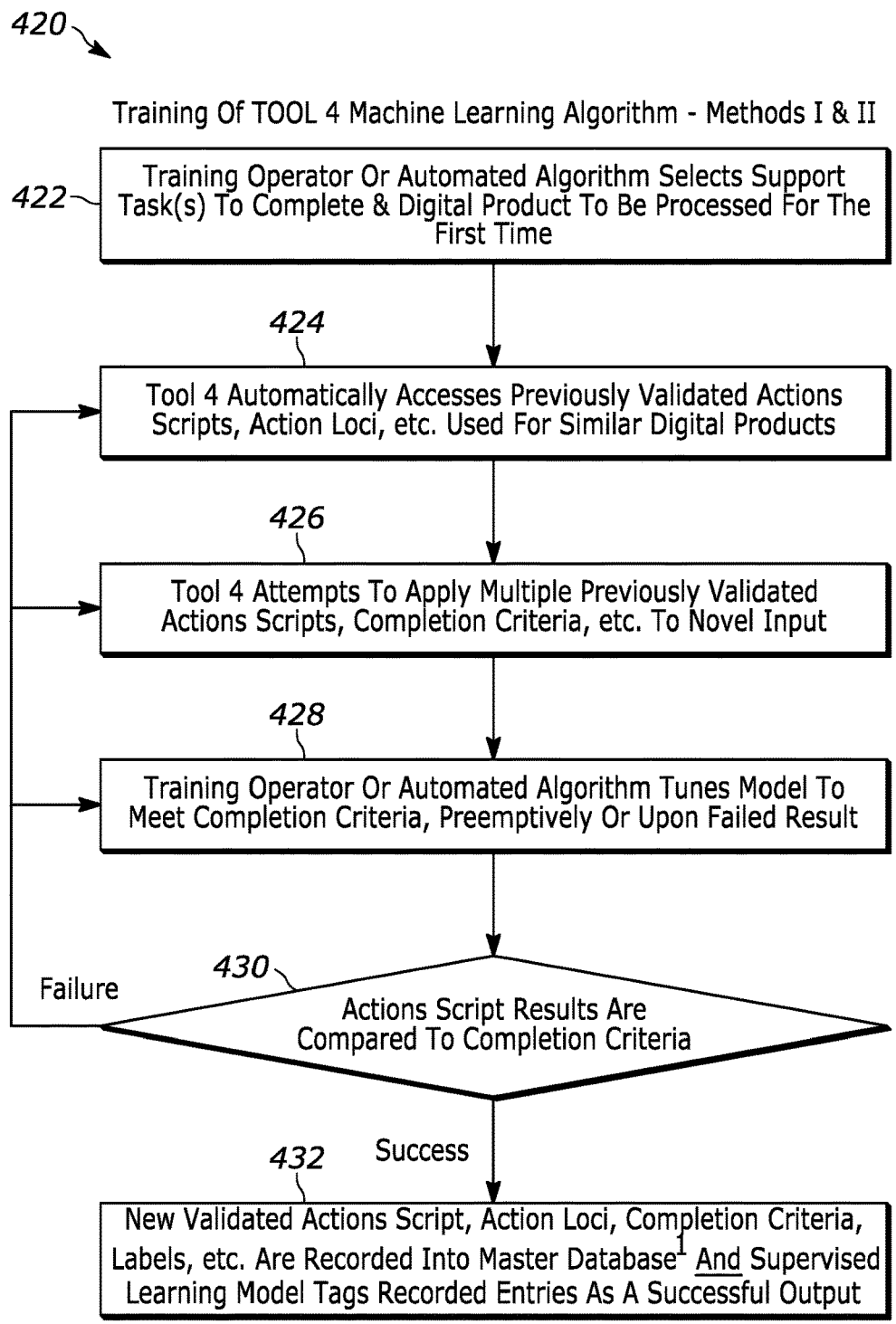
FIG. 4A illustrates a flow diagram of further exemplary methods for receiving a novel input for training the second AI model of FIG. 3 based on existing action script(s) and/or help base data, in accordance with various aspects disclosed herein.

Reference is made to FIG. 4A and method 420, blocks 420-432. In particular, FIG. 4A illustrates a flow diagram of further exemplary methods (e.g., method I and II as illustrated by method 420) for receiving a novel input for training the second AI model of FIG. 3 based on existing action script(s) and/or help base data, in accordance with various aspects disclosed herein. An automated computing instruction or application, or in some cases a training operator, selects a novel input to train on, noting the relevant digital product category, and selects a task from among the task title labels collected by TOOL 1, including task titles often associated with a particular digital product category (see, e.g., block 422). The training operator or automated algorithm then references the database of successful, qualified, and/or validated action scripts recorded using TOOL 1 for the same or similar task title and the same or similar digital product category (see, e.g., block 424); the database may contain many relevant qualified action scripts. TOOL 4 then autonomously attempts to execute the task using those qualified action scripts as for guidance (see, e.g., block 426). TOOL 4 is tuned (see, e.g., block 428) to allow for mismatched syntax (e.g., the text "Account Settings" is treated synonymously with "My Account"), for mismatched iconography (e.g. icons rendered as gear symbols are treated synonymously with icons that are rendered as slider bar symbols), and other variable factors in action loci and action scripts. In this way, TOOL 4 is able to adapt action scripts that were previously proven/validated on a predecessor digital product to fit a novel digital product. TOOL 4 also references the completion criteria for previously validated action scripts steps from the TOOL 1 database. TOOL 4 uses those criteria, along with generally required completion criteria, to confirm that the action script being applied in the novel case has completed the step in question (see, e.g., block 410). Once TOOL 4 has successfully completed the step in question (see, e.g., block 412), it records the successful actions that were employed to complete the step and ignores/deletes any attempted actions which were not successful. Once the overall task is complete, the full successful action script is recorded into the master database for future use. A redundancy analysis tool may be applied to the action script to see if any steps can be removed to improve speed or efficiency. If application of such tool results in the removal or edit of any steps, then the edited action script is re-tested on the actual digital product to confirm an error-free result. Any such validated action script resulting from Training Method I is also treated as a desired output for TOOL 4's ongoing training. Furthermore, any tuning measures which tend to result in successful/validated action scripts are also logged for future use with other novel inputs.

Additionally, or alternatively, an automated computing instruction or application is used to map all possible action link(s) or path(s) originating from the home page or initial state of a website, mobile app, or software application. This application can be an automated web browser or automated user interface that simulates a mobile or desktop operating system user. This automated application can be pre-programmed or otherwise configured to fill in common user parameters such as username, password, contact information, or the like. The automated application can be programmed or otherwise configured to navigate through the website or application, starting from the home page or initial state, by attempting all, or at least one or more, accessible pages or states accessible from each previous page or state, filling in the user's pre-programmed data as needed. The end-result is website or application mapping that shows all accessible pages and/or states of the website or otherwise application as crawled or otherwise traversed.

The terminal pages and/or states, as well as each of the intermediary pages and/or states, can be processed using an NLU model to identify one or more pages and/or states that correspond to task title labels collected by TOOL 1. The NLU model can be trained using supervised learning to correctly associate the terminal pages and/or states, as well as the intermediary pages and/or states, with the appropriate task title label(s), sometimes with guidance from a human operator, until the NLU model can produce the correct associations automatically. For example, these associations may be based on a threshold percentage of accuracy, for example, as determined by a confusion matrix of the NLU model or otherwise by the supervised learning algorithm used to train the NLU model.

Once a terminal page and/or state has been associated with a task title label or labels, the series of steps that led to the terminal page and/or state is automatically reverse-engineered to create an action script which is then associated with the task title label. That is, the series of steps required to arrive at particular page and/or state is automatically recorded as an action script during the initial mapping process performed by the automated web browser or user interface. The action script can then be recorded into the master database with the correct task title label(s) thereby associating the action script with that task title label(s). In this way one or more action script(s) may be requested and delivered by the NLU model or other AI model as an output when provided the related task title label(s) is/are submitted as input(s).

TOOL 4—Training Method II.

Reference is made to FIG. 4A and method 420, blocks 420-432. Using a training method similar to Training Method I, an automated computing instruction or application, or in some cases a training operator, also uses successful, qualified, and/or validated action scripts (including action loci, completion criteria, etc.) from the TOOL 1 database (see, e.g., blocks 422 and/or 424), but applies (see, e.g., block 426) them to different devices (or device versions) and/or different operating systems (or operating system versions) to try to achieve an error-free result with a novel input (in this case the "novelty" of the input is the alternate device and/or operating system). The training operator or algorithm incorporates tuning or adjustments (see, e.g., block 428) to the model to facilitate the conversion from one device type to another device type (e.g., it will convert mouse actions for a desktop device into touch-screen gestures for a mobile device), or from one operating system to another (e.g., it will factor in the standard keystrokes typical of the Windows operating systems, when converting from a database entry created for a MacOS operating system). Once an error-free result is achieved (see, e.g., blocks 430 and/or 432), a redundancy analysis tool is applied to see if any steps can be removed or edited to improve speed or efficiency. If application of such tool results in the removal or edit of any steps, then the edited action script is tested on the actual digital product to confirm an error-free result. Any such validated action script resulting from Training Method I is also treated as a desired output for TOOL 4's ongoing training. Again, any tuning or adjustment measures which tend to result in successful/validated action scripts conversions are also logged for future use with other novel inputs.

TOOL 4—Training Method III.

Figure 4B:
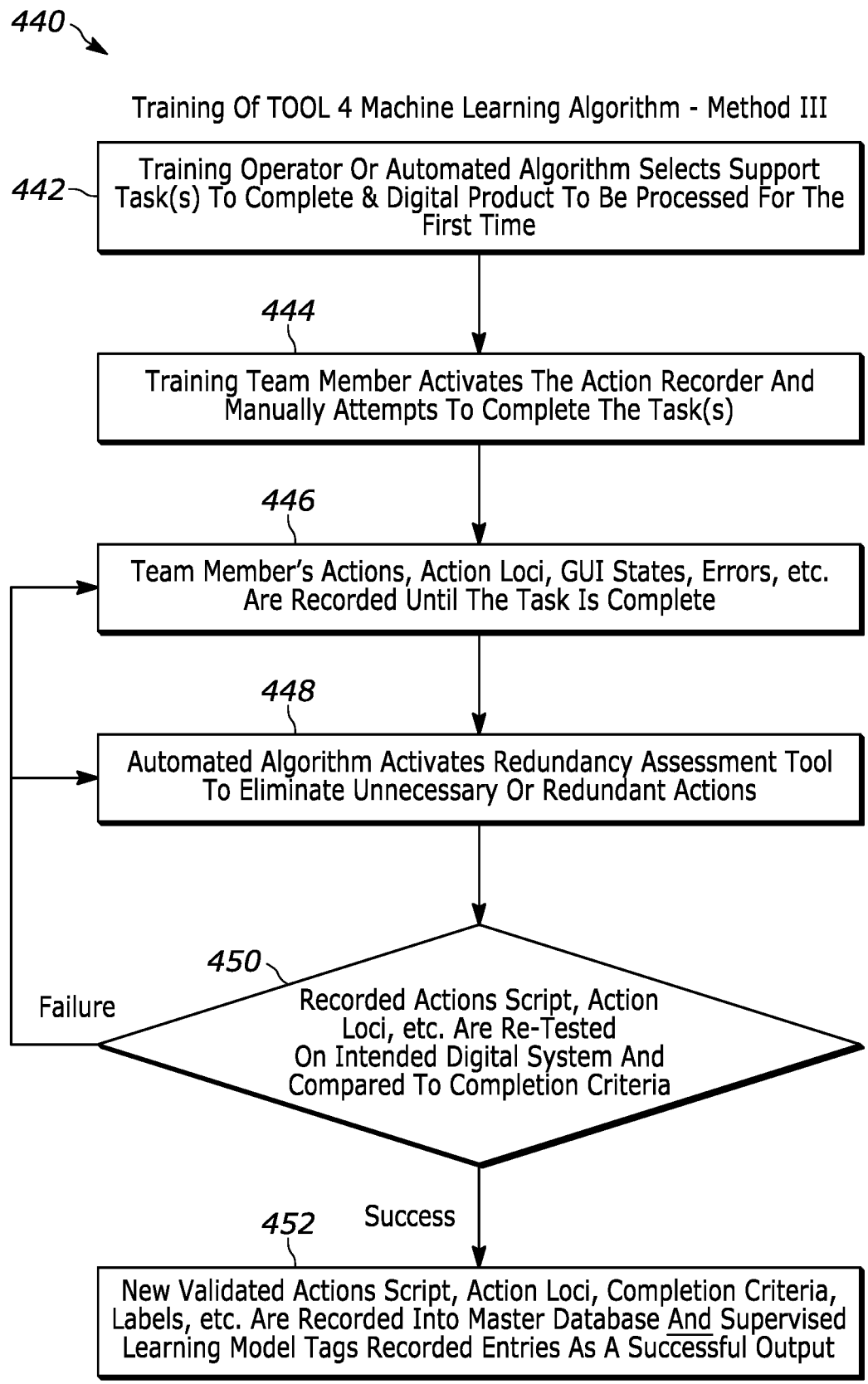
FIG. 4B illustrates a flow diagram of a further exemplary method for receiving a novel input for training the second AI model of FIG. 3 based on user activity, in accordance with various aspects disclosed herein.

Reference is made to FIG. 4B and method 440, blocks 440-452. TOOL 4 is also trained using the following supervised learning methodology. FIG. 4B illustrates a flow diagram of a further exemplary method (method III as illustrated by method 440) for receiving a novel input for training the second AI model of FIG. 3 based on user activity (e.g., team member activity), in accordance with various aspects disclosed herein.

1. One or more (e.g., a team) of test case humans is engaged to perform commonly requested customer service and technical support help tasks within different digital product categories (see, e.g., blocks 442 and/or 444). The team members are assigned digital product categories in which they have moderate previous experience, and then the team members are assigned individual websites, mobile apps, software applications and other digital products to work on. They are then instructed to visit/use the assigned digital products and perform the most commonly requested help tasks associated with that digital product category.

2. While executing the assigned tasks, the team-members use the digital action recorder referenced in the TOOL 1 description above. Using the action recorder, the team-members record any recordable actions (GUI and non-GUI actions), action loci and/or GUI states available to be recorded as they proceed with completing the assigned task (see, e.g., block 446).

3. The action recorder also automatically records the type of device, version of device, operating system, version of operating system, web browser type, version of web browser, and/or other data about the user's interface and device (each of these is a "device interface" label).

4. The actions performed by the team-members, as well as intermediary error states and action loci, are recorded by the action recorder into an action log in a digital format onto a computer or computer server. The recordings are organized in a database where each recording is associated with the various recorded labels, including the digital product category, the name of the website or digital product, the web browser used (including version), the operating system (including version) used, the type of task being performed, task title, as well as other data. Action logs for tasks which are not successfully completed are deleted (not retained). The action logs for tasks that are completed successfully are called completed action logs.

5. Once the completed action logs have been recorded into the database, TOOL 4 includes a redundancy assessment tool which determines if one or more of the steps undertaken by the human team-member could have been eliminated. See, e.g., block 448. If so, the redundancy assessment tool deletes the redundant steps, or otherwise edits the database entry.

6. Once the completed action logs have been adjusted or edited for redundancy, speed and effectiveness, they are converted into action scripts. To double-check that the adjustments/edits will not cause any errors (see, e.g., block 450), these action scripts are autonomously tested on "live" or actual versions of the website, mobile app, software application or other digital product that was used by the team-member, or on a simulator and/or virtual version of the former, using the same operating system and device versions recorded during the team-member's work. Once validated, these action scripts are labeled validated action scripts and are recorded into the TOOL 1 database for future use by TOOLS 1, 2, 3, 4, 5, 6, 8 and 9. Any such validated action script is also treated as a "desired output" for TOOL 4's ongoing training (see, e.g., block 452)

The three above-referenced training methods, in addition to other ones, are used to enhance TOOL 4's ability to adapt previously confirmed and/or validated action scripts to novel inputs. The training identifies and codifies the alternates, edits, substitutions, and/or adjustments to those action scripts that tend to result in error-free applications in novel circumstances. That is, the training helps TOOL 4 learn what types of substituted or adjusted steps can be applied to an existing validated action script when operating in a novel context. For example, if TOOL 4 is looking for a webpage to enter some settings information, but no gear symbol settings icon nor "Settings" hyperlink is available in the current GUI state, TOOL 4 may activate a hamburger symbol icon, if available, to search for alternate avenues for getting to the settings control area.

The various types of substitutions, adjustments, edits, etc. that TOOL 4 can incorporate can include any of the following non-limiting examples.

a. Alternate or synonymous text to be substituted/attempted;

b. Alternate symbols to be substituted/attempted;

c. Frequently-used website architectures or hierarchies to be substituted/attempted;

d. Frequently-used software application menu names, patterns and hierarchies to be substituted/attempted;

e. Frequently-used mobile app menu names, patterns, architecture and hierarchies to be substituted/attempted;

f. Searches for action loci (e.g. hyperlinks, text or symbols) that are not visible in the current GUI state, but are visible via scrolling or un-hiding; and/or g. Searches for action loci (e.g. hyperlinks, text or symbols) that are not visible in the current GUI state, but are visible by accessing an intermediary screen, window or webpage (e.g. if TOOL 4 is attempting to change printer settings and there is no access to any printer setting controls in the current GUI state, TOOL 4 can autonomously search for a web page or screen that is reachable from the current GUI state which does have such controls).

Operation of TOOL 4.

Reference is made to FIG. 3 and Method 400 comprising blocks 400-412. In particular, FIG. 3 illustrates a flow diagram of an exemplary method 400 for receiving a novel input for training a second AI model, in accordance with various aspects disclosed herein.

The operator of TOOL 4, or an automated computing instruction or application, begins by assembling a list of digital products to process (i.e. websites, mobile apps, software applications, etc.) See, e.g., block 402. The digital products are further classified according to sub-categories. For example, websites are divided into sub-categories like e-commerce, streaming video, news media, banking/finance, cloud applications, travel booking, restaurant booking, email clients, social media, etc.; mobile apps are divided into sub-categories like gaming, banking/finance, messaging, social media, etc.; software applications are divided into sub-categories like word processing, spreadsheets, email clients, video editing, music editing, photo editing, etc.

For each digital product sub-category, the operator of TOOL 4, or an automated computing instruction or application, collects a list of commonly requested or searched customer service self-help and support tasks—specific to that sub-category (see, e.g., block 404). These commonly requested tasks are obtained from multiple sources, including publicly and privately accessible data from third-party sources, as well as data obtained through the operations of TOOLS 1, 2, 3 and 4.

The operator of TOOL 4, or an automated computing instruction or application, selects a given website or other digital product to process, i.e. a novel input (see, e.g., block 406). If required, the tool can receive username and password credentials in order to access a given digital product, e.g. if that product were an internet website, or the tool can also receive user access to a device that is hosting a particular digital product to be processed, e.g. a software application on a desktop/laptop computer operating system.

TOOL 4 will then automatically search the master database of action scripts, action loci, Device Types, task titles, etc. to identify instances which have profiles that are similar to those of the novel input, e.g. the same or similar digital product category, the same or similar digital product sub-category, the same or similar Device Type, the same or similar operating system or operating system version, etc. TOOL 4 will then attempt to perform all task titles that are associated with those similar master database entries, using action scripts, action loci, completion criteria, etc. which have been associated with those similar master database entries.

TOOL 4 will automatically attempt to complete all assigned task titles using iterations of action scripts, action loci, etc. until a successful result is obtained, as measured by the completion criteria for the similar master database entries. If a successful result is not obtained after a number of iterations set in advance, TOOL 4 can automatically tune or make adjustments to the algorithm (see, e.g., block 408), e.g. the tool can be adjusted to apply the similar master database entries (action scripts, action loci, etc.) in a more or less strict way; it can be tuned/adjusted to try a wider variety of master database entries (i.e. entries that are less similar to the category/subcategory/device/operating system of the novel input); and/or it may be tuned/adjusted using more or less of the substitutions, adjustments, edits, etc. listed in the section above describing the training of TOOL 4.

If an attempted task is not successful after a discrete number of trials (to avoid becoming a shut-out or blocked user), TOOL 4 automatically terminates and/or alerts the operator of the sustained failure (see, e.g., block 410). At this point, the operator may make further adjustments in how the master database entries are applied to the novel input (e.g. broaden or narrow the allowable mismatches between the action loci text in the novel input as compared to the master database entries); or there may be an automated computing instruction for addressing errors; or the operator may perform the failed task as a manual human operator. (In the latter case, the operator will engage the Action Recording tool in a similar fashion as it used in TOOL 4—Training Method III, thereby enhancing TOOL 4's learning and further expanding the master database of validated/successful action scripts, action loci, etc.)

Once a successful result is obtained by TOOL 4 (see, e.g., block 412), it will add a new entry to the master database identifying all relevant information about the successful result, e.g.: (a) the action scripts, action loci, completion criteria which were used to obtain the successful result; (b) the device (including version) and operating system (including version) used in obtaining the successful result; (c) the task title being attempted; (d) any tuning/adjustments to the model that directly led to the successful result; and/or (e) any other relevant data.

TOOL 5: Automatic Updates and QA/QC for Help Bases. Automatic Updates for Help Guides.

TOOLS 1, 2, 3 and 4 offer a subscription, polling, or otherwise automatic update service or option, described below as TOOL 5. In the case of TOOL 1, this update service can be offered to enterprise clients to help them ensure that their website or product help base materials are up-to-date and error-free (TOOL 1 clients) or to ensure that any help guides produced by TOOLS 2 and 3 remain up-to-date and error-free.

TOOL 1 Updates.

For TOOL 1, the subscription service runs periodic testing on the client's help base articles to ensure quality and error-free status. TOOL 1 detects when a new website or app layout/architecture is causing an error. TOOL 1 provides a periodic report on any given help base article's validity status, which can be sent to the host/owner of a website or other digital product.

TOOLS 2 and 3 Updates.

In conjunction with help guides produced by TOOL 2 and 3, the TOOL 5 update service ensures that the help guides produced by TOOL 2 and 3 update automatically when a new website, app or software layout, architecture, and/or version is deployed (e.g. when a new website layout changes the location of the name or location of the Settings button/link).

The operator of TOOL 5, or an automated computer instruction, selects a website, software application, mobile app or other digital product ("digital product") to run updates on. TOOL 5 then periodically triggers the execution of all tasks in the master database associated with the digital product in question, according to a regularity schedule set by the tool operator or computer instruction.

If each task is completed successfully on the initial attempt, the master database entry is marked as up-to-date and/or verified.

If the task is not completed successfully, TOOL 5 will apply TOOL 4 to make adjustments to the action script, action loci, completion criteria, or other master database entries until the task has been successfully completed. (If TOOL 4 cannot successfully complete the task, an alert can be sent to the operator of TOOL 4 to request manual intervention to complete the task).

Once the task has been successfully completed, the new and/or corrected action script, action loci, completion, criteria, etc. entries are automatically entered into the master database, supplanting the old/flawed entries.

If any new master database entries have been entered, TOOLS 2 and 3 are automatically engaged in order to update any help guides associated with the updated entries, thereby ensuring that the TOOL 2 and 3 help guide contents are current and up-to-date.

TOOL 6: Internal Knowledge Bases.

In conjunction with TOOLS 1, 2, 3 and 4, TOOL 6 is used to construct help guides which are specifically designed for internal use by a company. These can be help guides that are then engineered and customized for use by customer support representatives ("CSRs") and by automated customer support chatbots, to help such CSRs, support personnel, and automated chatbots process customer service requests more quickly and easily. For example, when a CSR or chatbot receives a typical customer service support inquiry, it will often look up the recommended answer within a knowledge base that is internal to that enterprise and then provide a link or copy of a relevant help base article to the user/customer, or, in some aspects, verbally describe the process for completing the requested customer service help task. Using an internal database of help guides created using TOOLS 1, 2, 3 and 4, the CSR or chatbot can simply look up and send the user/customer a link to a help guide (either a Separate Window video or a Show Me How screen overlay guide), e.g., via email or text message.

TOOL 7: "Push" Products.

TOOLS 7 is used to connect with viewers who have previously viewed a help base guide, either in separate window mode (TOOL 2) or in Show Me How mode (e.g., TOOL 3). Once a viewer has accessed a help guide, their unique user information is registered using standard user identification techniques. TOOL 7 is implemented to push or send alerts to such users when the user is visiting or using a given enterprise client's digital product. The enterprise client can use these alerts to send and highlight new or improved functionality or services in the digital product, and if desired, provide an accompanying help guide. Using TOOL 7, enterprise clients can set up such push functionality to track or target users across various digital products.

TOOL 8: Extraction from How-To Videos.

How-to and technical support help videos exist currently and are abundantly available on the YOUTUBE platform, on other video hosting websites, and from numerous other sources throughout the internet. In the vast majority of cases, these videos are not proprietary to the enterprise providing the website, app or software product, so they are usually not vetted for quality assurance and quality control, and they are rarely updated when the website, app, and/or software architecture or layout changes.

TOOL 8 converts existing how-to videos into text, and then uses TOOLS 1 and 4 to convert these texts into help guides created by TOOLS 2 and 3. The resulting help guides are usually higher quality than the original videos, since then can be error-checked and standardized, and updated regularly, using TOOLS 1 and 5.

TOOL 8 records or extracts the audio soundtrack of publically-accessible, highly-ranked how-to videos and proprietary how-to videos for enterprise clients. TOOL 8 uses existing natural language processing ("NLP") algorithms to convert this audio into a written text transcript.

TOOL 8 then uses TOOL 1 to process those transcripts, convert them into a database entry of recorded actions, as described in the TOOL 1 section above.

TOOL 8 then uses TOOL 1 to error-check the sequence of recorded actions for accuracy and quality, as described in the TOOL 1 section above.

TOOL 8 then uses TOOL 2 to record screenshots of the recorded actions, as described in the TOOL 2 section above.

TOOL 8 then uses TOOL 2 to create animated help guides, as described in the TOOL 2 section above.

TOOL 8 also uses TOOL 3 to create "Show Me How" help guides, as described in the TOOL 3 section above.

While TOOL 8 is recording and/or extracting the audio from the existing how-to videos, it records periodic screenshots from those how-to videos. These screenshots may be stored in a database alongside the how-to video transcripts. The screenshots are time-coded, so that the screenshot can be associated with a specific moment when the various help commands are described in the audio transcript. These recorded screenshots are available to a technician operating TOOL 8 to provide manual corrections to the help guides produced using TOOL 2 and 3.

TOOL 8 operates (e.g., read, analyzes, and/or interprets) in all major languages, e.g., English, Mandarin Chinese, Hindi, Spanish, French, Standard Arabic, etc. In some aspects, processing of Data in how-to or technical support videos, related articles and/or other help-related media or content in various languages may be combined to generate a single help guide video in a different language. In this way, a help guide generated by TOOL 8 may be generated based on multiple, different languages, and, therefore, may be a new, more content-rich guide that would have otherwise not been created from resources available for a single language.

TOOL 9: Website for Help Searches Across the Universe of Digital Products—Using Most-Common Search Engine Terms.

TOOL 9 is a publicly accessible website ("central support site") that serves as a repository and locus for help guides covering the broad universe of websites, software applications, mobile apps and other digital products (collectively "digital products"). Users of virtually any digital product can find vetted and continuously updated help guides for the product they are using—factoring in the user's device, operating system, etc. The available subject matter for the help guides are curated based on actual search engine data, to ensure that the central support site contains the most relevant help guides for actual user support searches.

The operator of TOOL 9, or an automated computing instruction or application, accesses existing records and resources for internet search engine data to determine the most commonly searched help tasks for all categories and subcategories of digital products.

These support task searches from various internet search engines are logged into a database by TOOL 9, as well as the top-ranked help base results for each search. (Some of the search engine results may include help guides created by TOOLS 2 and 3.)

TOOLS 1 and 4 are used to error-check those top-ranked results, and then convert those results, using TOOLS 2, 3 and 8, into standardized help guides (both separate window videos and Show Me How guides).

The separate window video help guides are accessible, e.g., via a central YouTube channel or other streaming video resource, and are also hosted via the central support site.

The Show Me How guides are hosted via the central support site, and available for activation via an internet browser plug-in, e.g., for website products.

TOOL 5 is used to ensure that all help guides are kept up-to-date and/or accurate.

TOOL Computing Platform Environment/System

Each of the various products and/or tools, as described herein, comprise computing code, such as computing instructions, algorithms, applications, or the like, implementable and/or executable by one or more processors. FIG. 5 illustrates an example artificial intelligence (AI) based computer system configured to autonomously convert and error-check existing help base resources, in accordance with various aspects disclosed herein. For example, FIG. 5 illustrates an example artificial intelligence based system 1000 for autonomously generating help bases and related graphic components, in accordance with various aspects disclosed herein. The products/tools as described herein may be implemented via artificial intelligence based system 1000, which provides a computing platform or otherwise computing ecosystem for the implementation of the products/tools described herein.

In the example of FIG. 5, artificial intelligence based system 1000 includes server(s) 1002, which may comprise one or more computer servers. In various aspects server(s) 1002 comprise multiple servers, which may comprise multiple, redundant, or replicated servers as part of a server farm. In still further aspects, server(s) 1002 may be implemented as cloud-based servers, such as a cloud-based computing platform. For example, server(s) 1002 may be any one or more cloud-based platform(s) such as MICROSOFT AZURE, AMAZON AWS, GOOGLE CLOUD, or the like. Server(s) 1002 may include one or more processor(s) 1004 as well as one or more computer memories 1006. In various aspects, server(s) 1002 may be referred to herein as "tool based server(s)" or "NLU servers."

Memories 1006 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 1006 may store an operating system (OS) (e.g., Microsoft Windows, Linux, UNIX, etc.) capable of facilitating the functionalities, apps, methods, or other software as discussed herein. Memorie(s) 1006 may also store an artificial intelligence (AI) models implementing natural language understanding (NLU) algorithms, (e.g., a NLU based model 1008) which may be an artificial intelligence based model, such as a machine learning model, trained on help base data, media, or otherwise content, as described herein. Additionally, or alternatively, the NLU based model 1008 may also be stored in database 1005, which is accessible or otherwise communicatively coupled to server(s) 1002. In addition, memories 1006 may also store machine readable instructions, including any of one or more application(s) (e.g., a machine learning based application as described herein), one or more software component(s), and/or one or more application programming interfaces (APIs), which may be implemented to facilitate or perform the features, functions, or other disclosure described herein, such as any of the products and/or tools, or other such methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine learning model or component, such as the NLU based model 1008, where each may be configured to facilitate their various functionalities discussed herein. It should be appreciated that one or more other applications may be envisioned and that are executed by the processor(s) 1004.

The processor(s) 1004 may be connected to the memories 1006 via a computer bus responsible for transmitting electronic data, data packets, or otherwise electronic signals to and from the processor(s) 1004 and memories 1006 in order to implement or perform the machine readable instructions, methods, processes, elements or limitations, as illustrated, depicted, or described for the various flowcharts, illustrations, diagrams, figures, and/or other disclosure herein.

Processor(s) 1004 may interface with memory 1006 via the computer bus to execute an operating system (OS). Processor(s) 1004 may also interface with the memory 1006 via the computer bus to create, read, update, delete, or otherwise access or interact with the data stored in memories 1006 and/or the database 1004 (e.g., a relational database, such as Oracle, DB2, MySQL, or a NoSQL based database, such as MongoDB). The data stored in memories 1006 and/or database 1005 may include all or part of any of the data or information described herein, including, for example, training data (e.g., including help base data, media, or otherwise content, such as text, graphics, audible content, etc. from one or more help bases, as described herein), or other information, including text, graphics, or the like, or as otherwise described herein.

Server(s) 1002 may further include a communication component configured to communicate (e.g., send and receive) data via one or more external/network port(s) to one or more networks or local terminals, such as computer network 1020 and/or terminal 1009 (for rendering or visualizing GUIs) described herein. In some aspects, server(s) 1002 may include a client-server platform technology such as ASP.NET, Java J2EE, Ruby on Rails, Node.js, a web service or online API, responsive for receiving and responding to electronic requests. The server(s) 1002 may implement the client-server platform technology that may interact, via the computer bus, with the memories(s) 1006 (including the applications(s), component(s), API(s), data, etc. stored therein) and/or database 1005 to implement or perform the machine readable instructions, methods, processes, elements or limitations, as illustrated, depicted, or described for the various flowcharts, illustrations, diagrams, figures, and/or other disclosure herein.

In various aspects, the server(s) 1002 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 1020. In some aspects, computer network 1020 may comprise a private network or local area network (LAN). Additionally, or alternatively, computer network 1020 may comprise a public network such as the Internet.

Imaging server(s) 1002 may further include or implement an operator interface configured to present information to an administrator or operator and/or receive inputs from the administrator or operator. As shown in FIG. 5, an operator interface may provide a display screen (e.g., via terminal 1009). Imaging server(s) 1002 may also provide I/O components (e.g., ports, capacitive or resistive touch sensitive input panels, keys, buttons, lights, LEDs), which may be directly accessible via, or attached to, server(s) 1002 or may be indirectly accessible via or attached to terminal 1009. According to some aspects, an administrator or operator may access the server 1002 via terminal 1009 to review information, make changes, input training data, graphics, video, images, etic., initiate training of NLU based model 1008, and/or perform other functions as described herein.

In some aspects, server(s) 1002 may perform the functionalities as discussed herein as part of a "cloud" network or may otherwise communicate with other hardware or software components within a cloud, or otherwise server based system (as illustrated for FIG. 5), to send, retrieve, or otherwise analyze data or information described herein. For example, in various aspects, any one or more of the products or tools, as described herein, may implement or execute computing instructions for gathering data or information from various networked sources. Such computing instructions may be implemented via various programming languages, including, for example, Python, Java, C#, C++, JavaScript, or the like. The computing instructions may cause one or more processors (e.g., processor(s) 1004) to receive, gather, aggregate help base data or information as described herein. Such help base data and/or information may include, for example, help base data, media, or otherwise content, such as text, graphics, audible content, etc. from one or more help bases. Such help base data and/or information may be scraped or otherwise downloaded from various sources. Additionally, or alternatively, such data or information may be accessed from application programming interfaces (APIs) via computer network 1020. For example, computing instructions, e.g., executing on processor(s) 1004, may download information by accessing a representational transfer state (RESTful) API as implemented on one or more remote server(s).

With reference to FIG. 5, and as a non-limiting example, each of servers 1062 and 1064 may be servers that store help base data, media, or otherwise content, as described herein. For example, each of servers 1062 and 1064 may host video and/or text information comprising "help" content for a specific product or service. Server 1062 may represent, for example, a YOUTUBE server that hosts video content comprising "help" content for a specific product or service (e.g., a video teaching users how to use or interact with a specific service or product). Similarly, server 1064 may represent, for example, a help base of a given company (e.g., a help base provided by QUICKEN INC. providing text articles and/or videos on how to use or troubleshoot Quicken software). The computing instructions, e.g., executing on processor(s) 1004, may download, scrape, or otherwise access the graphic, text, and/or other such help data or information from server(s) 1062 and/1064. Such data or information may then be utilized as training data, or production data (use data), with NLU based model 1008 for either training such model or using the model to generate help bases, help articles, and/or text, graphics, or other help base artifacts or assets, for example, as described herein.

In general, a computer program or computer based product, application, or code (e.g., the model(s), such as AI models, or other computing instructions described herein)

may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 1004 (e.g., working in connection with the respective operating system in memories 1006) to facilitate, implement, or perform the machine readable instructions, methods, processes, elements or limitations, as illustrated, depicted, or described for the various products, tools, flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 5, server(s) 1002 are communicatively connected, via computer network 1020 to the one or more user computing devices 1011$c1$-1011$c3$ and/or 1012$c1$-1012$c3$ via base stations 1011$b$ and 1012$b$. In some aspects, base stations 1011$b$ and 1012$b$ may comprise cellular base stations, such as cell towers, communicating to the one or more user computing devices 1011$c1$-1011$c3$ and 1012$c1$-1012$c3$ via wireless communications 1021 based on any one or more of various mobile phone standards, including NMT, GSM, CDMA, UMMTS, LTE, 5G, or the like. Additionally or alternatively, base stations 1011$b$ and 1012$b$ may comprise routers, wireless switches, or other such wireless connection points communicating to the one or more user computing devices 1011$c1$-1011$c3$ and 1012$c1$-1012$c3$ via wireless communications 1022 based on any one or more of various wireless standards, including by non-limiting example, IEEE 802.11a/b/c/g (WIFI), the BLUETOOTH standard, or the like.

Any of the one or more user computing devices 1011$c1$-1011$c3$ and/or 1012$c1$-1012$c3$ may comprise mobile devices and/or client devices for accessing and/or communications with server(s) 1002. Such mobile devices may comprise one or more mobile processor(s) and/or a digital camera for capturing images. In various aspects, user computing devices 1011$c1$-1011$c3$ and/or 1012$c1$-1012$c3$ may comprise a mobile phone (e.g., a cellular phone), a tablet device, a personal data assistance (PDA), a laptop, or the like, including, by non-limiting example, an APPLE iPhone or iPad device or a GOOGLE ANDROID based mobile phone or table.

In various aspects, the one or more user computing devices 1011$c1$-1011$c3$ and/or 1012$c1$-1012$c3$ may implement or execute an operating system (OS) or mobile platform such as APPLE'S iOS and/or GOOGLE'S ANDROID operating system. Any of the one or more user computing devices 1011$c1$-1011$c3$ and/or 1012$c1$-1012$c3$ may comprise one or more processors and/or one or more memories for storing, implementing, or executing computing instructions or code, e.g., a mobile application or a home or personal assistant application, as described in various aspects herein.

User computing devices 1011$c1$-1011$c3$ and/or 1012$c1$-1012$c3$ may comprise a wireless transceiver to receive and transmit wireless communications 1021 and/or 1022 to and from base stations 1011$b$ and/or 1012$b$. Each of the one or more user computer devices 1011$c1$-1011$c3$ and/or 1012$c1$-1012$c3$ may include a display screen for displaying graphics, images, text, digital content, data, pixels, features, and/or other such visualizations or information as described herein. In various aspects, graphics, images, text, product recommendations, data, pixels, features, and/or other such visualizations or information may be received from server(s) 1002 for display on the display screen of any one or more of user computer devices 1011$c1$-1011$c3$ and/or 1012$c1$-1012$c3$.

In various aspects, the computing instructions, as implemented on an application (app) of a user computer device may comprise, implement, have access to, render, or otherwise expose, at least in part, an interface or a guided user interface (GUI) for displaying text and/or graphics or images on its display screen.

In various aspects, autonomously generated help base and/or graphic components, as described herein, including help guides, content, including text, graphics, or elsewhere as described herein, may be transmitted to user computing devices 1011$c1$-1011$c3$ and/or 1012$c1$-1012$c3$ for display on a display screen via a GUI. The user(s) of using any one or more of computing devices 1011$c1$-1011$c3$ and/or 1012$c1$-1012$c3$ may then interact with such help guides and related content via display and/or GUIs of these devices.

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The Figures described herein depict various aspects of the system and methods disclosed. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals. There are shown in the drawings arrangements which are presently discussed, it being understood, however, that the present aspects are not limited to the precise arrangements and instrumentalities shown.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various aspects, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In aspects in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

What is claimed is:

1. An artificial intelligence (AI) based computer system configured to autonomously create customer service help guides delivered via a graphic user interface (GUI) with graphical and textual elements, the AI based computer system comprising:
   one or more processors;
   one or more memories; and;
   computing instructions stored in the one or more memories that when executed by the one or more processors, cause the one or more processors to:
   automatically crawl one or more digital product categories;
   create one or more action scripts derived from crawling the one or more digital product categories,
   store the one or more action scripts in the one or more memories, wherein each action script is comprised of one or more user directives for completing one or more user tasks on a computing device and by a software application (app) configured to render a GUI on a display screen of the computing device, and wherein each action script corresponds to at least one user task of the one or more user tasks and is adapted to operate on the computing device, the software app, and the GUI,
   implement a natural language understanding (NLU) model to associate the one or more action scripts with text of the one or more user tasks stored in the one or more memories,
   test the one or more action scripts against completion criteria for each of the one or more user directives to output one or more success results indicating that a least a subset of the one or more actions scripts achieves the competition criteria, train an AI model based on the one or more actions scripts, the text of the one or more user tasks, and the completion criteria, wherein the AI model is configured to output an identified action script based on text corresponding to the one or more user tasks as used to train the AI model, autonomously convert each action script into one or more graphic-and-text displays which can be overlaid onto the GUI of the computing device, receive a request from a client device of a user for assistance with a given user task, wherein the client device is a device corresponding to the computing device, and render, in response to the request, the one or more graphic-and-text displays associated with a relevant action script on a GUI of the client device of the user to display one or more user directives to visually indicate how to complete the given user task, wherein the relevant action script is determined by the AI model.

2. The AI based computer system of claim 1, wherein the computing instructions, when executed by the one or more processors, further cause the one or more processors to:

determine an action locus defining a position on, area of, or location within the GUI for which to implement or render the one or more graphic-and-text displays associated with the relevant action script, wherein the position, area, or location is recorded with the relevant action script so that the graphic-and-text displays associated with each of the one or more user directives are rendered on the GUI of the client device when the user requests assistance with the given user task.

3. The AI based computer system of claim 1, wherein the computing instructions, when executed by the one or more processors, further cause the one or more processors to:

determine that validation of a failed action script of the one or more actions scripts has failed, retrain the AI model (i) with action script recordings from a human user performing the same or similar tasks, or (ii) with one or more sets of help base data associated with the task, convert, with the AI model, the action script recordings or sets of help base data into a new action script, the new action script based on an updated version of the failed action script as configured, and validate the new action script prior to storing the new action script in the one or more memories, wherein validation of the new action script comprises automatically executing the action script to produce an output result and comparing the output result to one or more completion criteria.

4. The AI based computer system of claim 1, wherein at least one of the one or more action scripts is converted to operate on an intended digital device or with an intended software program that is different from the computing device or software app for which the at least one action script was originally created.

5. The AI based computer system of claim 1, wherein associating the one or more action scripts with the text comprises adjusting the text or substituting the text based on similar language or graphical syntax.

6. The AI based computer system of claim 1, wherein the relevant action script is executable to perform at one of the one or more user directives for the user automatically without additional input from the user.

7. The AI based computer system of claim 1, wherein the graphic-and-text displays are rendered within or part of a separate window video GUI.

8. The AI based computer system of claim 1, wherein the graphic-and-text displays are rendered within or part of the GUI as an overlay on the GUI.

9. The AI based computer system of claim 1, wherein the computing instructions, when executed by the one or more processors, further cause the one or more processors to:

receive a novel input comprised of a digital or software product;

generate a map of one or more pages or states accessible within the digital or software product out to one or more terminal pages or states, wherein each link or path required to reach the one or more pages or states, including intermediary pages or states, is recorded in the one or more memories;

process each of the one or more pages or states using the NLU model to determine which of the one or more task labels from a database of task descriptors are applicable to each of the one or more pages or states; and train the NLU model based on one of the following: (a) the one or more task labels and the one or more pages or states, wherein the NLU model is configured to output a task label based on corresponding one or more pages or states as input; or (b) train the NLU model based on the one or more task labels and the one or more pages or states, wherein the NLU model is configured to output the corresponding one or more pages or states based on a task label as input.

10. The AI based computer system of claim 1, wherein the computing instructions, when executed by the one or more processors, further cause the one or more processors to:

create and record action scripts by recording the actions of a human operator who has been assigned a specific task to complete on a computing device enabled with a GUI.

11. The AI based computer system of claim 1, wherein the computing instructions, when executed by the one or more processors, further cause the one or more processors to:

create and record action scripts by (i) autonomously crawling help base resources to identify a set of help base data associated with a task and (ii) autonomously converting, using the AI model, the help base data into action scripts.

12. The AI based computer system of claim 1, wherein the computing instructions, when executed by the one or more processors, further cause the one or more processors to:

error-check the one or more action scripts on a continuous or periodic basis to confirm that the one or more user directives of the one or more action scripts are without error.

13. The AI based computer system of claim 1, wherein the computing instructions, when executed by the one or more processors, further cause the one or more processors to:

update the action scripts so that the one or more user directives of the one or more action scripts comprise one or more of: a direct set of links or paths for completion of the user task, a lack of redundant links or paths, or a reduction of one or more inefficient links or paths.

14. The AI based computer system of claim 1, wherein the AI model is further trained with one or more previously recorded action scripts that have been error-checked or updated.

15. The AI based computer system of claim 1, wherein the computing instructions, when executed by the one or more processors, further cause the one or more processors to:
- assess a progress status of the user as the user progresses through each of the one or more user directives of a given action script, wherein the progress status of the user is used to confirm that a first one of the one or more user directives has been completed prior to displaying a second one of the one or more user directives associated with a subsequent directive of the given action script.

16. The AI based computer system of claim 1, wherein the computing instructions, when executed by the one or more processors, further cause the one or more processors to:
- display one or more visual messages or play one or more audio messages to alert the user when the user has failed to complete a given user directive of the one or more user directives, and
- display a user directive to correct an action or complete the given user directive.

17. The AI based computer system of claim 1, wherein autonomously converting each action script further comprises autonomously converting each action script to audio content, wherein the audio content provides one or more user directives audibly indicating how to complete the given user task.

18. An artificial intelligence (AI) based computer method for autonomously creating customer service help guides delivered via a graphic user interface (GUI) with graphical and textual elements, the AI based computer method comprising:
- automatically crawling, by one or more processors, one or more digital product categories;
- creating, by the one or more processors, one or more action scripts derived from crawling the one or more digital product categories;
- storing, by the one or more processors, the one or more action scripts in one or more memories, wherein each action script is comprised of one or more user directives for completing one or more user tasks on a computing device and by a software application (app) configured to render a GUI on a display screen of the computing device, and wherein each action script corresponds to at least one user task of the one or more user tasks and is adapted to operate on the computing device, the software app, and the GUI;
- implementing, by the one or more processors, a natural language understanding (NLU) model to associate the one or more action scripts with text of the one or more user tasks stored in the one or more memories;
- testing, by the one or more processors, the one or more action scripts against completion criteria for each of the one or more user directives to output one or more success results indicating that a least a subset of the one or more actions scripts achieves the competition criteria;
- training, by the one or more processors, an AI model based on the one or more actions scripts, the text of the one or more user tasks, and the completion criteria, wherein the AI model is configured to output an identified action script based on text corresponding to the one or more user tasks as used to train the AI model;
- autonomously converting, by the one or more processors, each action script into one or more graphic-and-text displays which can be overlaid onto the GUI of the computing device;
- receiving, by the one or more processors, a request from a client device of a user for assistance with a given user task, wherein the client device is a device corresponding to the computing device; and
- rendering, by the one or more processors in response to the request, the one or more graphic-and-text displays associated with a relevant action script on a GUI of the client device of the user to display one or more user directives to visually indicate how to complete the given user task, wherein the relevant action script is determined by the AI model.

19. A tangible, non-transitory computer-readable medium storing instructions for autonomously creating customer service help guides delivered via a graphic user interface (GUI) with graphical and textual elements, that when executed by one or more processors cause the one or more processors to:
- automatically crawl one or more digital product categories;
- create one or more action scripts derived from crawling the one or more digital product categories;
- store the one or more action scripts in one or more memories, wherein each action script is comprised of one or more user directives for completing one or more user tasks on a computing device and by a software application (app) configured to render a GUI on a display screen of the computing device, and wherein each action script corresponds to at least one user task of the one or more user tasks and is adapted to operate on the computing device, the software app, and the GUI;
- implement a natural language understanding (NLU) model to associate the one or more action scripts with text of the one or more user tasks stored in the one or more memories;
- test the one or more action scripts against completion criteria for each of the one or more user directives to output one or more success results indicating that a least a subset of the one or more actions scripts achieves the competition criteria;
- train an AI model based on the one or more actions scripts, the text of the one or more user tasks, and the completion criteria, wherein the AI model is configured to output an identified action script based on text corresponding to the one or more user tasks as used to train the AI model;
- autonomously convert each action script into one or more graphic-and-text displays which can be overlaid onto the GUI of the computing device;
- receive a request from a client device of a user for assistance with a given user task, wherein the client device is a device corresponding to the computing device; and
- render, in response to the request, the one or more graphic-and-text displays associated with a relevant action script on a GUI of the client device of the user to display one or more user directives to visually indicate how to complete the given user task, wherein the relevant action script is determined by the AI model.

* * * * *